(12) United States Patent  
Hunter et al.

(10) Patent No.: US 9,147,338 B2
(45) Date of Patent: *Sep. 29, 2015

(54) SYSTEM AND METHOD FOR EMERGENCY NOTIFICATION CONTENT DELIVERY

(71) Applicant: Google Inc., Mountain View, CA (US)

(72) Inventors: Charles Eric Hunter, Hilton Head Island, SC (US); Bernard L. Ballou, Raleigh, NC (US); John H. Hebrank, Durham, NC (US); James Fallon, Armonk, NY (US); Robert D. Summer, New York, NY (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/784,264

(22) Filed: Mar. 4, 2013

(65) Prior Publication Data

US 2013/0241726 A1 Sep. 19, 2013

Related U.S. Application Data

(60) Division of application No. 11/469,348, filed on Aug. 31, 2006, now Pat. No. 8,412,147, which is a continuation of application No. 09/990,450, filed on Nov. 21, 2001, now Pat. No. 7,233,781.

(60) Provisional application No. 60/332,168, filed on Nov. 16, 2001, provisional application No. 60/328,263, filed on Oct. 10, 2001.

(51) Int. Cl.
*G08B 23/00* (2006.01)
*G08B 27/00* (2006.01)
(Continued)

(52) U.S. Cl.
CPC ............... *G08B 27/00* (2013.01); *G09F 27/00* (2013.01); *H04W 4/22* (2013.01); *H04W 68/00* (2013.01); *H04W 76/007* (2013.01)

(58) Field of Classification Search
CPC ..... H04W 4/22; H04W 11/04; H04W 76/007; B60R 21/0152
USPC .......... 340/539.1, 539.11, 539.13; 455/404.1, 455/404.2, 550.1
See application file for complete search history.

(56) References Cited

U.S. PATENT DOCUMENTS 3,373,517 A 3/1968 Halperin
3,376,465 A 4/1968 Corpew
(Continued)

FOREIGN PATENT DOCUMENTS

EP 0 683 943 11/1993
EP 0 954 176 11/1999
(Continued)

OTHER PUBLICATIONS

U.S. Pat. No. 5,825,354, Oct. 1998, Ahmad et al. (withdrawn).
(Continued)

*Primary Examiner* — Daryl Pope
(74) *Attorney, Agent, or Firm* — Kilpatrick Townsend & Stockton LLP

(57) ABSTRACT

A method for disseminating emergency notification content from an emergency originating source. The method comprising: delivering the emergency notification content from the emergency originating source to at least one transmitting party; selecting a subset of users from among a set of users for dissemination of the emergency notification content based on the subject matter of the emergency notification content; and delivering the emergency notification content from the at least one transmitting party to a device corresponding to each user from the selected subset of users.

20 Claims, 11 Drawing Sheets

(51) Int. Cl.
*G09F 27/00* (2006.01)
*H04W 4/22* (2009.01)
*H04W 68/00* (2009.01)
*H04W 76/00* (2009.01)

(56) References Cited

U.S. PATENT DOCUMENTS

| | | |
|---|---|---|
| 3,848,193 A | 11/1974 | Martin et al. |
| 3,941,926 A | 3/1976 | Slobodzian et al. |
| 3,983,317 A | 9/1976 | Glorioso |
| 3,993,955 A | 11/1976 | Belcher et al. |
| 4,094,010 A | 6/1978 | Pepperl et al. |
| 4,155,042 A | 5/1979 | Permut et al. |
| 4,332,022 A | 5/1982 | Ceshkovsky et al. |
| 4,368,485 A | 1/1983 | Midland |
| 4,476,488 A | 10/1984 | Merrell |
| 4,536,791 A | 8/1985 | Campbell et al. |
| 4,559,480 A | 12/1985 | Nobs |
| 4,575,750 A | 3/1986 | Callahan |
| 4,595,950 A | 6/1986 | Lofberg |
| 4,654,482 A | 3/1987 | DeAngelis |
| 4,716,410 A | 12/1987 | Nozaki |
| 4,734,779 A | 3/1988 | Levis et al. |
| 4,734,858 A | 3/1988 | Schlafly |
| 4,761,641 A | 8/1988 | Schreiber |
| 4,797,913 A | 1/1989 | Kaplan et al. |
| 4,812,843 A | 3/1989 | Champion, III et al. |
| 4,829,569 A | 5/1989 | Seth-Smith et al. |
| 4,847,825 A | 7/1989 | Levine |
| 4,862,268 A | 8/1989 | Campbell et al. |
| 4,908,713 A | 3/1990 | Levine |
| 4,949,187 A | 8/1990 | Cohen |
| 5,046,090 A | 9/1991 | Walker et al. |
| 5,051,822 A | 9/1991 | Rhoades |
| 5,073,925 A | 12/1991 | Nagata et al. |
| 5,107,107 A | 4/1992 | Osborne |
| 5,121,430 A | 6/1992 | Ganzer et al. |
| 5,123,046 A | 6/1992 | Levine |
| 5,133,079 A | 7/1992 | Ballantyne et al. |
| 5,182,669 A | 1/1993 | Chikuma et al. |
| 5,191,573 A | 3/1993 | Hair |
| 5,214,793 A | 5/1993 | Conway et al. |
| 5,233,423 A | 8/1993 | Jernigan et al. |
| 5,235,587 A | 8/1993 | Bearden et al. |
| 5,251,193 A | 10/1993 | Nelson et al. |
| 5,257,017 A | 10/1993 | Jones et al. |
| 5,260,778 A | 11/1993 | Kauffman et al. |
| 5,274,762 A | 12/1993 | Peterson et al. |
| 5,283,731 A | 2/1994 | LaLonde et al. |
| 5,297,204 A | 3/1994 | Levine |
| 5,311,423 A | 5/1994 | Clark |
| 5,319,735 A | 6/1994 | Preuss et al. |
| 5,355,302 A | 10/1994 | Martin et al. |
| 5,365,282 A | 11/1994 | Levine |
| 5,373,330 A | 12/1994 | Levine |
| 5,414,432 A | 5/1995 | Penny et al. |
| 5,414,756 A | 5/1995 | Levine |
| 5,418,713 A | 5/1995 | Allen |
| 5,420,647 A | 5/1995 | Levine |
| 5,420,923 A | 5/1995 | Beyers, II et al. |
| 5,428,606 A | 6/1995 | Moskowitz |
| 5,465,291 A | 11/1995 | Barrus et al. |
| 5,469,020 A | 11/1995 | Herrick |
| 5,473,584 A | 12/1995 | Oshima |
| 5,486,819 A | 1/1996 | Horie |
| 5,495,283 A | 2/1996 | Cowe |
| 5,497,186 A | 3/1996 | Kawasaki |
| 5,497,479 A | 3/1996 | Hornbuckle |
| 5,508,815 A | 4/1996 | Levine |
| 5,512,935 A | 4/1996 | Majeti et al. |
| 5,513,260 A | 4/1996 | Ryan |
| 5,530,751 A | 6/1996 | Morris |
| 5,532,920 A | 7/1996 | Hartrick et al. |
| 5,543,856 A | 8/1996 | Rosser et al. |
| 5,557,541 A | 9/1996 | Schulhof et al. |
| 5,559,549 A | 9/1996 | Hendricks et al. |
| 5,565,909 A | 10/1996 | Thibadeau et al. |
| 5,568,272 A | 10/1996 | Levine |
| 5,592,511 A | 1/1997 | Schoen et al. |
| 5,592,551 A | 1/1997 | Lett et al. |
| 5,592,626 A | 1/1997 | Papadimitriou et al. |
| 5,600,839 A | 2/1997 | MacDonald |
| 5,612,741 A | 3/1997 | Loban et al. |
| 5,619,247 A | 4/1997 | Russo |
| 5,621,863 A | 4/1997 | Boulet et al. |
| 5,627,895 A | 5/1997 | Owaki |
| 5,628,050 A | 5/1997 | McGraw et al. |
| 5,630,067 A | 5/1997 | Kindell et al. |
| 5,638,113 A | 6/1997 | Lappington et al. |
| 5,640,453 A | 6/1997 | Schuchman et al. |
| 5,644,859 A | 7/1997 | Hsu |
| 5,646,603 A | 7/1997 | Nagata et al. |
| 5,646,997 A | 7/1997 | Barton |
| 5,654,747 A | 8/1997 | Ottesen et al. |
| 5,659,366 A | 8/1997 | Kerman |
| 5,659,613 A | 8/1997 | Copeland et al. |
| 5,661,516 A | 8/1997 | Carles |
| 5,664,018 A | 9/1997 | Leighton |
| 5,675,734 A | 10/1997 | Hair |
| 5,684,918 A | 11/1997 | Abecassis |
| 5,686,954 A | 11/1997 | Yoshinobu et al. |
| 5,689,799 A | 11/1997 | Dougherty et al. |
| 5,692,214 A | 11/1997 | Levine |
| 5,701,161 A | 12/1997 | Williams et al. |
| 5,701,383 A | 12/1997 | Russo et al. |
| 5,701,397 A | 12/1997 | Steimle et al. |
| 5,710,869 A | 1/1998 | Godefray et al. |
| 5,717,814 A | 2/1998 | Abecassis |
| 5,717,832 A | 2/1998 | Steimle et al. |
| 5,721,827 A | 2/1998 | Logan et al. |
| 5,721,951 A | 2/1998 | DorEl |
| 5,724,062 A | 3/1998 | Hunter |
| 5,724,091 A | 3/1998 | Freeman et al. |
| 5,724,525 A | 3/1998 | Beyers, II et al. |
| 5,734,413 A | 3/1998 | Lappington et al. |
| 5,740,326 A | 4/1998 | Boulet et al. |
| 5,748,716 A | 5/1998 | Levine |
| 5,758,257 A | 5/1998 | Herz et al. |
| 5,760,820 A | 6/1998 | Eda et al. |
| 5,761,606 A | 6/1998 | Wolzien |
| 5,781,734 A | 7/1998 | Ohno et al. |
| 5,790,202 A | 8/1998 | Kummer et al. |
| 5,790,937 A | 8/1998 | Gutle |
| 5,799,285 A | 8/1998 | Klingman |
| 5,805,154 A | 9/1998 | Brown |
| 5,805,763 A | 9/1998 | Lawler et al. |
| 5,809,139 A | 9/1998 | Girod et al. |
| 5,818,806 A | 10/1998 | Wong et al. |
| 5,822,432 A | 10/1998 | Moskowitz et al. |
| 5,825,407 A | 10/1998 | Cowe et al. |
| 5,826,123 A | 10/1998 | Lai |
| RE35,954 E | 11/1998 | Levine |
| 5,832,287 A | 11/1998 | Atalla |
| 5,835,896 A | 11/1998 | Fisher et al. |
| 5,841,979 A | 11/1998 | Schulhof et al. |
| 5,845,083 A | 12/1998 | Hamadani et al. |
| 5,848,129 A | 12/1998 | Baker |
| 5,848,155 A | 12/1998 | Cox |
| 5,848,352 A | 12/1998 | Dougherty et al. |
| 5,854,779 A | 12/1998 | Johnson et al. |
| 5,860,068 A | 1/1999 | Cook |
| 5,870,717 A | 2/1999 | Wiecha |
| 5,874,985 A | 2/1999 | Matthews, III |
| 5,889,868 A | 3/1999 | Moskowitz et al. |
| 5,890,136 A | 3/1999 | Kipp |
| 5,897,622 A | 4/1999 | Blinn et al. |
| 5,898,384 A | 4/1999 | Alt et al. |
| 5,899,980 A | 5/1999 | Wilf et al. |
| 5,903,878 A | 5/1999 | Talati et al. |
| 5,905,800 A | 5/1999 | Moskowitz et al. |
| 5,909,492 A | 6/1999 | Payne et al. |
| 5,915,027 A | 6/1999 | Cox et al. |
| 5,915,068 A | 6/1999 | Levine |
| 5,918,213 A | 6/1999 | Bernard et al. |

(56) References Cited

U.S. PATENT DOCUMENTS

| | | |
|---|---|---|
| 5,930,369 A | 7/1999 | Cox et al. |
| 5,933,798 A | 8/1999 | Linnartz |
| 5,934,795 A | 8/1999 | Rykowski et al. |
| 5,940,135 A | 8/1999 | Petrovic et al. |
| 5,940,807 A | 8/1999 | Purcell |
| 5,943,670 A | 8/1999 | Prager |
| 5,946,665 A | 8/1999 | Suzuki et al. |
| 5,949,885 A | 9/1999 | Leighton |
| 5,959,945 A | 9/1999 | Kleiman |
| 5,960,081 A | 9/1999 | Vynne et al. |
| 5,960,411 A | 9/1999 | Hartman et al. |
| 5,963,264 A | 10/1999 | Jackson |
| 5,963,915 A | 10/1999 | Kirsch |
| 5,963,917 A | 10/1999 | Ogram |
| 5,966,440 A | 10/1999 | Hair |
| 5,966,697 A | 10/1999 | Fergerson et al. |
| 5,969,283 A | 10/1999 | Looney et al. |
| 5,969,715 A | 10/1999 | Dougherty et al. |
| 5,970,471 A | 10/1999 | Hill |
| 5,970,472 A | 10/1999 | Allsop et al. |
| 5,970,473 A | 10/1999 | Gerszberg et al. |
| 5,970,474 A | 10/1999 | LeRoy et al. |
| 5,970,475 A | 10/1999 | Barnes et al. |
| 5,974,396 A | 10/1999 | Anderson et al. |
| 5,978,775 A | 11/1999 | Chen |
| 5,983,199 A | 11/1999 | Kaneko |
| 5,983,200 A | 11/1999 | Slotznick |
| 5,983,201 A | 11/1999 | Fay |
| 5,988,078 A | 11/1999 | Levine |
| 5,992,888 A | 11/1999 | North et al. |
| 6,002,772 A | 12/1999 | Saito |
| 6,005,564 A | 12/1999 | Ahmad et al. |
| 6,013,007 A | 1/2000 | Root et al. |
| 6,014,491 A | 1/2000 | Hair |
| 6,025,868 A | 2/2000 | Russo |
| 6,052,554 A | 4/2000 | Hendricks et al. |
| 6,067,107 A | 5/2000 | Travaille et al. |
| 6,067,532 A | 5/2000 | Gebb |
| 6,073,372 A | 6/2000 | Davis |
| 6,084,510 A | 7/2000 | Lemelson et al. |
| 6,091,883 A | 7/2000 | Artigalas et al. |
| 6,115,348 A | 9/2000 | Guerra |
| 6,148,142 A | 11/2000 | Anderson |
| 6,148,428 A | 11/2000 | Welch et al. |
| 6,150,964 A | 11/2000 | McLaughlin |
| 6,233,389 B1 | 5/2001 | Barton et al. |
| 6,233,682 B1 | 5/2001 | Fritsch |
| 6,240,401 B1 | 5/2001 | Oren et al. |
| 6,456,331 B2 | 9/2002 | Kwoh |
| 6,462,665 B1 | 10/2002 | Tarlton et al. |
| 6,493,874 B2 | 12/2002 | Humpleman |
| 6,509,833 B2 | 1/2003 | Tate |
| 6,542,759 B1 | 4/2003 | Fujiki et al. |
| 6,549,719 B2 | 4/2003 | Mankovitz |
| 6,567,502 B2 | 5/2003 | Zellner et al. |
| 6,604,240 B2 | 8/2003 | Ellis et al. |
| 6,608,559 B1 | 8/2003 | Lemelson et al. |
| 6,681,326 B2 | 1/2004 | Son et al. |
| 6,708,157 B2 | 3/2004 | Stefik et al. |
| 6,769,020 B2 | 7/2004 | Miyazaki et al. |
| 6,829,368 B2 | 12/2004 | Meyer et al. |
| 6,842,628 B1 | 1/2005 | Arnold et al. |
| 6,944,600 B2 | 9/2005 | Stefik et al. |
| 6,990,678 B2 | 1/2006 | Zigmond |
| 6,999,946 B2 | 2/2006 | Nuttall |
| 7,032,237 B2 | 4/2006 | Tsunoda et al. |
| 7,039,684 B2 | 5/2006 | Blockton et al. |
| 7,233,781 B2 | 6/2007 | Hunter et al. |
| 7,251,330 B2 | 7/2007 | Terao et al. |
| 8,412,147 B2 * | 4/2013 | Hunter et al. ............ 455/404.1 |
| 2001/0002852 A1 | 6/2001 | Kwoh |
| 2001/0003846 A1 | 6/2001 | Rowe et al. |
| 2001/0005906 A1 | 6/2001 | Humpleman |
| 2001/0010045 A1 | 7/2001 | Stefik et al. |
| 2001/0010095 A1 | 7/2001 | Ellis et al. |
| 2001/0013037 A1 | 8/2001 | Matsumoto |
| 2001/0013120 A1 | 8/2001 | Tsukamoto |
| 2001/0014882 A1 | 8/2001 | Stefik et al. |
| 2001/0016836 A1 | 8/2001 | Boccon-Gibod et al. |
| 2001/0017920 A1 | 8/2001 | Son et al. |
| 2001/0018742 A1 | 8/2001 | Hirai |
| 2001/0018858 A1 | 9/2001 | Dwek |
| 2001/0023416 A1 | 9/2001 | Hosokawa |
| 2001/0023417 A1 | 9/2001 | Stefik et al. |
| 2001/0023428 A1 | 9/2001 | Miyazaki et al. |
| 2001/0024425 A1 | 9/2001 | Tsunoda et al. |
| 2001/0024566 A1 | 9/2001 | Mankovitz |
| 2001/0025259 A1 | 9/2001 | Rouchon |
| 2001/0025269 A1 | 9/2001 | Otsuka |
| 2001/0025316 A1 | 9/2001 | Oh |
| 2001/0027561 A1 | 10/2001 | White et al. |
| 2001/0027563 A1 | 10/2001 | White et al. |
| 2001/0029491 A1 | 10/2001 | Yoneta et al. |
| 2001/0029538 A1 | 10/2001 | Blockton et al. |
| 2001/0029583 A1 | 10/2001 | Palatov et al. |
| 2001/0030660 A1 | 10/2001 | Zainoulline |
| 2001/0031066 A1 | 10/2001 | Meyer et al. |
| 2001/0032131 A1 | 10/2001 | Mowry |
| 2001/0032132 A1 | 10/2001 | Moran |
| 2001/0032133 A1 | 10/2001 | Moran |
| 2001/0032187 A1 | 10/2001 | Nuttall |
| 2001/0032312 A1 | 10/2001 | Runje et al. |
| 2001/0034635 A1 | 10/2001 | Winters |
| 2001/0034714 A1 | 10/2001 | Terao et al. |
| 2001/0034883 A1 | 10/2001 | Zigmond |
| 2002/0076003 A1 | 6/2002 | Zellner et al. |
| 2002/0085703 A1 | 7/2002 | Proctor |
| 2002/0168958 A1 | 11/2002 | Ford et al. |
| 2003/0036412 A1 | 2/2003 | Chong |
| 2003/0069002 A1 | 4/2003 | Hunter et al. |
| 2007/0275690 A1 | 11/2007 | Hunter et al. |

FOREIGN PATENT DOCUMENTS

| | | |
|---|---|---|
| EP | 0 954 179 | 11/1999 |
| EP | 0 975 111 | 1/2000 |
| EP | 0 977 389 | 2/2000 |
| EP | 0 984 631 | 3/2000 |
| EP | 0 994 470 | 4/2000 |
| EP | 1 104 195 | 5/2001 |
| EP | 1 143 721 | 10/2001 |
| WO | WO 91/03112 | 3/1991 |
| WO | WO 96/26605 | 8/1996 |
| WO | WO 96/34467 | 10/1996 |
| WO | WO 96/34494 | 10/1996 |
| WO | WO 99/18727 | 4/1999 |
| WO | WO 00/07368 | 2/2000 |
| WO | WO 00/54237 | 9/2000 |
| WO | WO 01/41013 | 6/2001 |
| WO | WO 01/47249 | 6/2001 |

OTHER PUBLICATIONS

"Wink Television Press Room," http://www.wink.com/contents/PressReleases.shtml, downloaded and printed on May 14, 2002.

"Wink Announces First National Advertising Partners: AT&T, Levi Strauss & Co., and GE," http://www.wink.com/contents/PressReleases/930708938/content.shtml, downloaded and printed on May 14, 2002, dated Sep. 9, 1998.

"Wink Communications, Inc., Changes the Advertising Landscape," http://www.wink.com/contents/PressReleases/930709807/content.shtml, downloaded and printed on May 14, 2002, dated Jan. 21, 1999.

"Wink's History," http://www.wink.com/contents/history.shtml, dowloaded and printed on May 14, 2002.

"How Wink Works," http://www.wink.com/contents/howitworks.shtml, downloaded and printed on May 14, 2002.

"What is Wink: Examples," http://www.wink.com/contents/examples.shtml, downloaded and printed on May 14, 2002.

"The Wink System," http://www.wink.com/contents/tech.sub.--diagram.shtml, downloaded and printed on May 14, 2002.

"Wink Response Server and Wink Response Network," http://www.wink.com/contents/tech.sub.--wrs.shtml, downloaded and printed on May 14, 2002.

(56) References Cited

OTHER PUBLICATIONS

"ICAP and HTML (ATVEF)," http://www.wink.com/contents/tech.sub.--icap.shtml, downloaded and printed on May 14, 2002.
"Wink Studio and Wink Server Studio," http://www.wink.com/contents/tech.sub.--studio.shtml, downloaded and printed on May 14, 2002.
"Wink Broadcast Server," http://www.wink.com/contents/tech.sub.--wbs.shtml, downloaded and printed on May 14, 2002.
"Wink Client Software," http://www.wink.com/contents/tech.sub.--engine.shtml, downloaded and printed on May 14, 2002.
"DataPlay, Inc.—Universal Recording Media—Discover," http://www/dataplay.com/jsp.sub.--files/en/discover/index-music.jsp, downloaded and printed on May 14, 2002, (Copyright 2001).
"DataPlay, Inc.—Universal Recording Media—What's Playing on DataPlay," http://www/dataplay.com/servlets/ProductList?action=productSearch, downloaded and printed on May 14, 2002, (Copyright 2001).
"DataPlay, Inc.—Universal Recording Media—What's Playing on DataPlay," http://www/dataplay.com/jsp.sub.--files/en/whatsplaying/products.jsp?acti-on=details, downloaded and printed on May 14, 2002, (Copyright 2001).
"DataPlay, Inc.—Universal Recording Media—Industry," http://www.dataplay.com/jsp.sub.--files/en/industry/products-digitalmedia-_.jsp, downloaded and printed on May 14, 2002, (Copyright 2001).
"DataPlay, Inc.—Universal Recording Media—Industry," http://www.dataplay.com/jsp.sub.--files/en/industry/products-engines.jsp, downloaded and printed on May 14, 2002, (Copyright 2001).
"DataPlay, Inc.—Universal Recording Media—Industry," http://www.dataplay.com/jsp.sub.--files/en/industry.contentproviders.jsp, downloaded and printed on May 14, 2002, (Copyright 2001).
"DataPlay, Inc.—Universal Recording Media—Industry," http://www.dataplay.com/jsp.sub.--files/en/industry/products-contentkey.j-_sp, downloaded and printed on May 14, 2002, (Copyright 2001).
"DataPlay, Inc.—Universal Recording Media—Industry," http://www.dataplay.com/jsp.sub.--files/en/industry/index.jsp, downloaded and printed on May 14, 2002, (Copyright 2001).
"What's Playing on DataPlay—Everything Digital," DataPlay Micro-optical Engine Product Brochure, downloaded and printed on May 14, 2002, (Copyright 2000-2002).
"What's Playing on DataPlay—Everything Digital," DataPlay Digital Media Product Brochure, downloaded and printed on May 14, 2002, (Copyright 2000-2001).
"Onsale Invoice," http://www.onsale.com/cgi-win/invoice.exe, dated Jan. 19, 1998, printed Jan. 20, 1998, (Copyright 1997).
Onsale Packing Sheet (Jason Deep Space Series 225 X 60 Astronomy Telescope), received Jul. 1999.
Egghead Packing Receipt (Franklin Rex Organizer), received Dec. 1999.
"Sell Goods to Egghead.com," http://www.egghead.com/ShowPage.dll?page=hd.sub.--aboutus.sub.--sellgoods-.sub.--p, printed Sep. 29, 2001.
"Demographics profile," http://www.egghead.com/ShowPage.dll?page=hd.sub.--aboutus.sub.--demo.sub.-_--p, printed Sep. 29, 2001.
"About us," http://www.egghead.com/ShowPage.dll?page=hd.sub.--aboutus.sub.--aboutus.s-_ub.--p, printed Sep. 29, 2001.
"Privacy and Security Policy," http://www.egghead.com/ShowPage.dll?page=hd.sub.--policy.sub.--policyandp-rivacy.sub.--p, printed Sep. 29, 2001.
"Registration," http://www.egghead.com/ShowPage.dll?page=reg.sub.--page1.sub.--ceos&S=1, printed Sep. 26, 2001.
"New Credit Information," https://secure.fairmarket.com/secure/Cre...FM1001, printed Sep. 26, 2001.
"Quadrant 256MB, PC133 (PC-100 Compatible), 32.times.64, 7ns, 168-Pin, SdRAM DIMM Module (New)," wysiwyg;//253/http://auctions.egghead.com...LotNo=65659811&BatchNo=0, printed Sep. 24, 2001.
"Ashton Digital VisionGate 52 15.1' TFT-LCD, Pivot Screen, USB Hub, w/Speakers," wysiwyg://253/http://auctions.egghead.com...LotNo=66044439, printed Sep. 26, 2001.
"Login/Logout," http://www.egghead.com/ShowPage.dll?page...44439, printed Sep. 29, 2001.
"Enter Your Bid," wysiwyg://218/http://auctions.egghead.com...5a99, printed Sep. 29, 2001.
"Enter Your Bid," https://auctions.egghead.com/scripts/...ShipCountry=US, printed Sep. 29, 2001.
"Confirm Your Bid," wysiwyg://220/http://auctions.egghead.com...ShipCountry=US, printed Sep. 29, 2001.
"Bid Receipt for Bid No. 5270411," wysiwyg://220/http://auctions.egghead.com...KioskListing=0, printed Sep. 29, 2001.
"Universal Product Code(UPC) and EAN Article Numbering Code (EAN) Page," http://www.adams1.com/pub/russadam/upccode.html, by Russ Adams, printed Sep. 24, 2001.
"Internet Archive Way Back Machine—Searched for http://www.egghead.com," printed Apr. 8, 2002, (Copyright 2001).
"Internet Archive Way Back Machine—Searched for http://www.onsale.com," printed Apr. 8, 2002, (Copyright 2001).
"Calimetrics' Multilevel Technology Enables Higher-Performance CD/DVD Recorders: An IDC White Paper," Wolfgang Schlichting, (Copyright 2000).
"Making Digital Cinema Actually Happen—What it Takes and Who's Going to Do It," Steven A Morley, (Copyright 1998).
"Streaming Onto the Movie Screen, with Nary a Scratch," Karen J. Bannan, The New York Times, May 9, 2002, p. E5.
U.S. Appl. No. 09/990,450, Advisory Action mailed on Feb. 22, 2006, 3 pages.
U.S. Appl. No. 09/990,450, Final Office Action mailed on Nov. 7, 2005, 16 pages.
U.S. Appl. No. 09/990,450, Non-Final Office Action mailed on May 17, 2005, 17 pages.
U.S. Appl. No. 09/990,450, Non-Final Office Action mailed on May 19, 2006, 19 pages.
U.S. Appl. No. 09/990,450, Notice of Allowance mailed on Feb. 2, 2007, 6 pages.
U.S. Appl. No. 09/990,450, Restriction Requirement mailed on Jun. 21, 2004, 4 pages.
U.S. Appl. No. 09/990,450, Supplemental Notice of Allowance mailed on May 1, 2007, 5 pages.
U.S. Appl. No. 09/990,450, Supplemental Notice of Allowance mailed on May 3, 2007, 5 pages.
U.S. Appl. No. 09/990,450, Supplemental Notice of Allowance mailed on Apr. 5, 2007, 5 pages.
U.S. Appl. No. 11/469,348, Advisory Action mailed on Apr. 14, 2010, 5 pages.
U.S. Appl. No. 11/469,348, Final Office Action mailed on Jan. 13, 2010, 10 pages.
U.S. Appl. No. 11/469,348, Non-Final Office Action mailed on Jun. 30, 2009, 12 pages.
U.S. Appl. No. 11/469,348, Notice of Allowance mailed on Nov. 28, 2012, 8 pages.
U.S. Appl. No. 11/469,348, Restriction Requirement mailed on Dec. 3, 2008, 6 pages.
U.S. Appl. No. 11/469,348, Restriction Requirement mailed on Mar. 11, 2009, 6 pages.

* cited by examiner

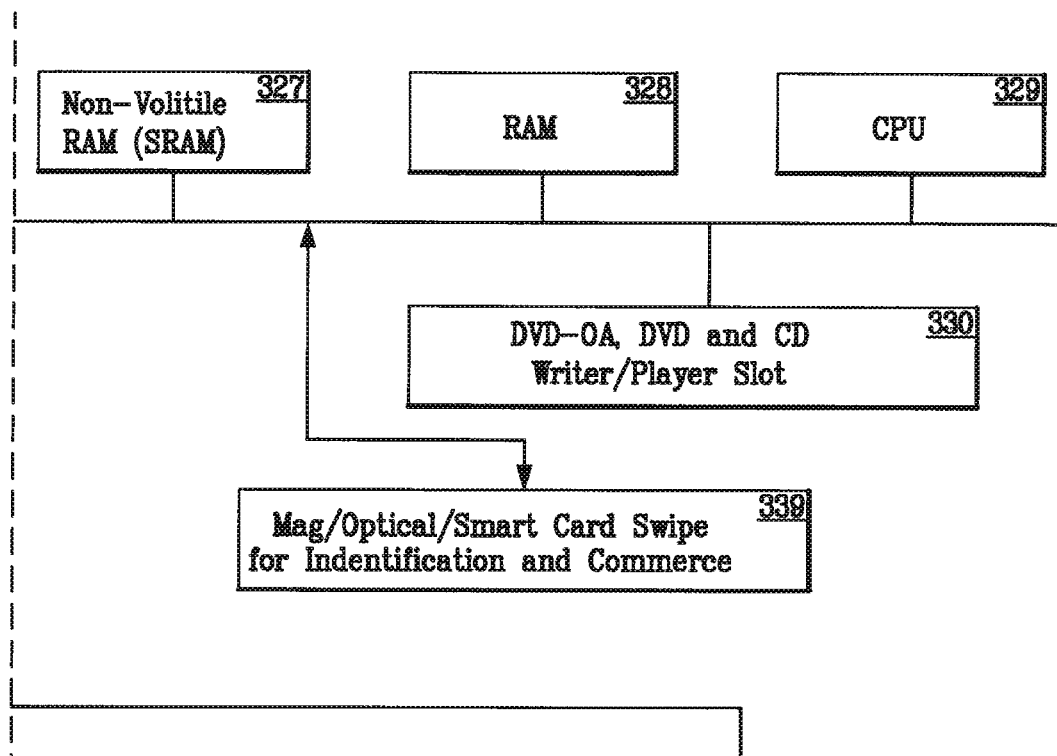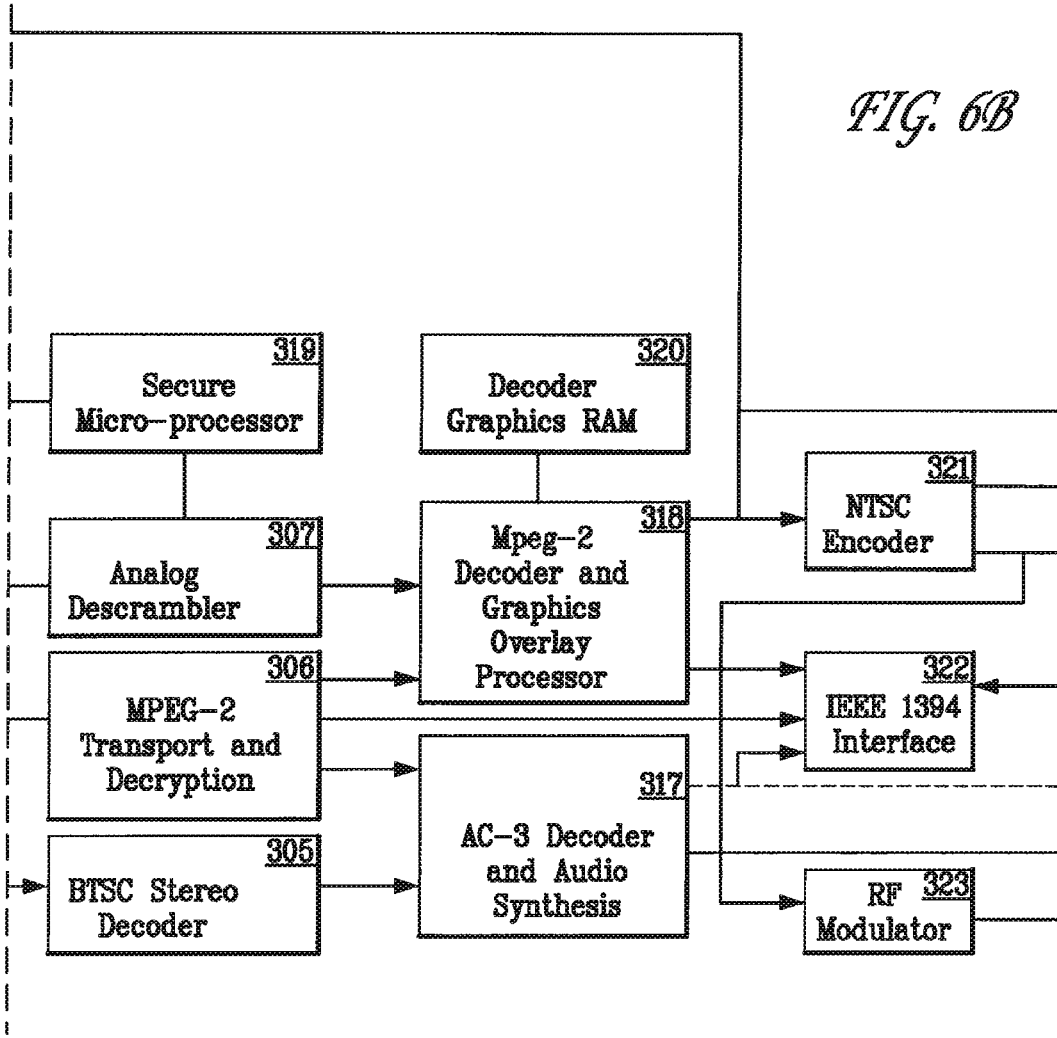
FIG. 6B

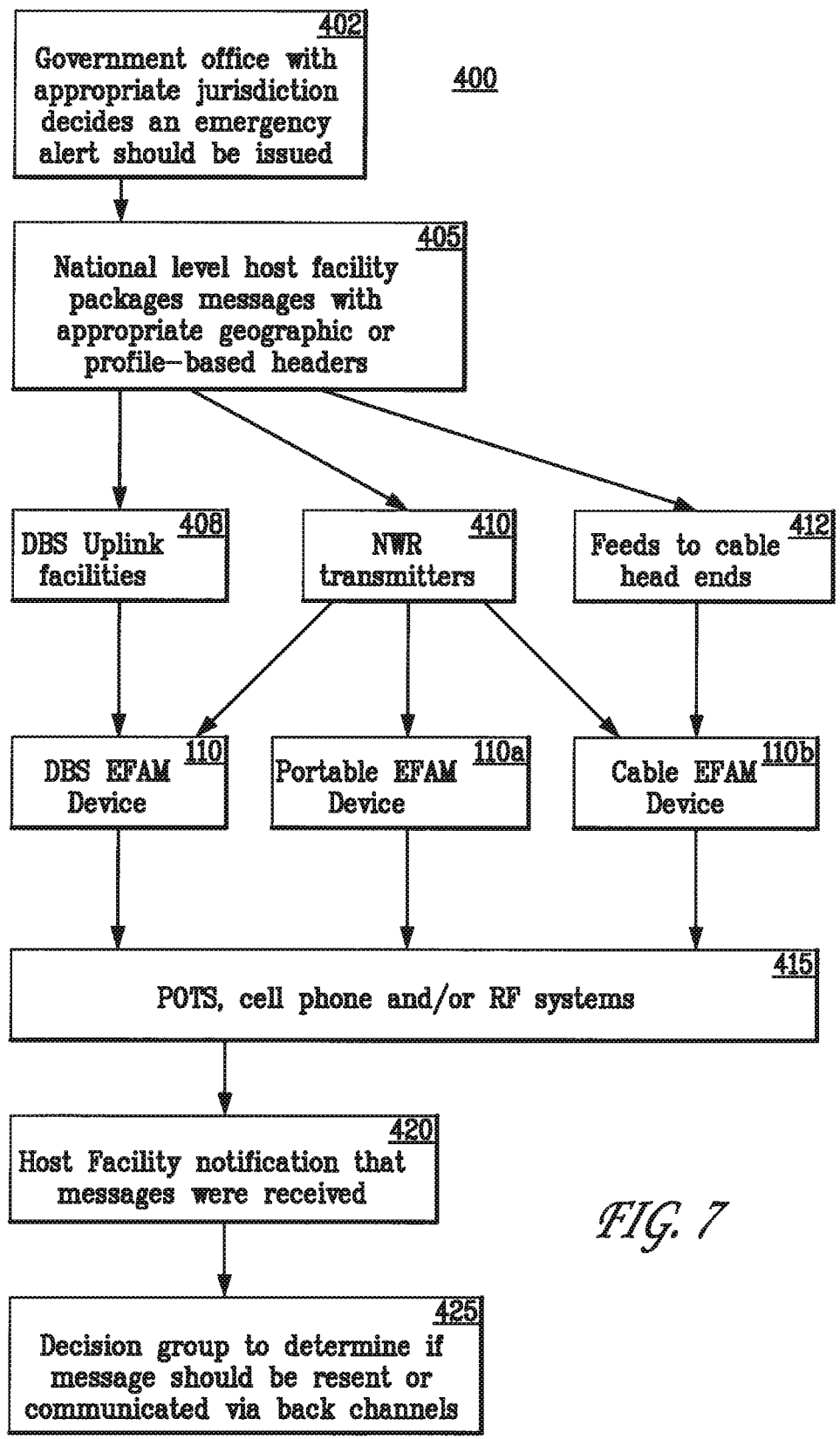

SYSTEM AND METHOD FOR EMERGENCY NOTIFICATION CONTENT DELIVERY

CROSS-REFERENCE TO RELATED APPLICATIONS

This application is a divisional of U.S. application Ser. No. 11/469,348 filed Aug. 31, 2006 which is a continuation of U.S. application Ser. No. 09/990,450, filed on Nov. 21, 2001, now U.S. Pat. No. 7,233,781, which claims the benefit of U.S. Provisional Application No. 60/328,263, filed on Oct. 10, 2001 and U.S. provisional application Ser. No. 60/332,168, filed on Nov. 16, 2001. Each of which is hereby incorporated by reference in its entirety.

TECHNICAL FIELD

The present invention relates generally to disseminating emergency information to the public, and more particularly, to a system and method for disseminating emergency notification content either from an emergency originating source or generated from a feedback system of sensors. In either case, the emergency notification content can then be disseminated to the public at large or directed to only those individuals who are most affected by the content.

BACKGROUND

Traditional barriers between the boundaries of broadcast television, direct broadcast satellite networks, cable systems, MMDS, terrestrial network operators, internet technologies, dedicated point to point wide area networks, and general purpose computing have begun to rapidly dissolve. In particular, we are witnessing the gradual migration of these technologies to an integrated whole. In the development of the interconnection architectures that will be enabling of these emergent home and portable multimedia entertainment and commerce systems, we will witness the growth of topologies analogous to the evolution of centralized and distributed computing, transmission, and storage architectures. Present applications for these types of systems include interactive entertainment, all forms of electronic commerce, digital music downloads, digital video downloads, pay per view, pay per play audio, near or true video on demand, near or true audio on demand, near or true books on demand, software downloads and distribution, interactive advertising, gaming, home banking, education, and regionalized or end user targeted weather and news, (to name but a few).

Within the current art of the emergency broadcast system, a traditional television viewer or radio station listener is notified of an alert message by a signal broadcast by one or more central emergency centers which interrupts the current programming. In the event of a disaster or other emergency, all stations viewers or listeners receive a uniform message containing the nature of the emergency and related advisory information.

Thus a fundamental problem within the current art is the presumption that the station or stations broadcasting the emergency notification will reach all viewers. This is further compounded by the now broad proliferation of channels and media options.

Another problem within the current art is that members of the target notification audience may not be presently viewing or listening on any form of media at all, let alone one that has an emergency broadcast notification capability, and further may be otherwise engaged in activities and locations that make notification by traditional broadcast means unfeasible.

Another problem within the current art is the broadcast nature of the emergency notification. In particular, once emergency notification content has been created it must be continuously rebroadcast until updated information has been created. Thus the presentation of information is in a serial format and the viewer or listener must continuously stay "tuned in" for a complete message, along with future updates.

Yet another problem within the current art is the need for a broadcast station or node to keep re-broadcasting the emergency notification content. In the event that this transmitting station or node is rendered inoperative by any means, for example by the emergency itself such as a terrorist attack or natural disaster, normal random system failure, or by any other means, the message may times.

Yet another problem within the current art is within the broadcast nature of the message itself. Viewers and listeners in differing geographic areas, individuals with different personal needs or concerns, emergency workers and support personnel with diverse skills, all have both a need and desire for differing information, and all are currently presented with a uniform message, limited in scope and content due to the amount of information that can be continuously rebroadcast within a reasonable time period.

SUMMARY

Therefore, it is an object of the present invention to provide a system and method for generating, delivering and otherwise disseminating emergency notification content to an intended audience, which overcomes the problems associated with the prior art.

It is a further object of the present invention to provide a system and method for disseminating emergency notification content to an intended audience, that implements a novel data collection system equipped with the ability to sense at least one environmental/physical condition, initiate an alert notification at a particular sensor location when applicable, and transmit data indicative of the condition to an intended audience such as a governmental agency, local emergency personnel, medical facilities, and the like.

It is another object of the present invention to provide a system and method for disseminating emergency notification content that implements a data collection system equipped with one or more sensors for detecting one or more of a plurality of potentially hazardous environmental conditions including temperature (e.g., either high or low extremes), radiation (e.g., neutron and high energy nuclear particles), toxic chemicals and gases (e.g., industrial chemicals and military gases such as Sarin), biohazards, gases (e.g., carbon monoxide, methane, propane or natural gas), smoke, water and air quality, humidity, shock (from a blast, a tornado, or earthquake) and pressure and, that processes the data to tailor an appropriate emergency notification message and deliver that message to an appropriate host facility for further dissemination of the emergency notification content.

Accordingly, a method for disseminating emergency notification content from an emergency originating source is provided. The method comprises: delivering the emergency notification content from the emergency originating source to at least one transmitting party; selecting a subset of users from among a set of users for dissemination of the emergency notification content based on the subject matter of the emergency notification content; and delivering the emergency notification content from the at least one transmitting party to a device corresponding to each user from the selected subset of users.

Preferably, the method further comprises providing filtering instructions in the device for filtering out at least a portion of the emergency notification content for a particular user, wherein the displaying comprises displaying the remainder of the emergency notification content other than the portion filtered out to the particular user. The method also preferably further comprises transmitting a GPS location of the device from the device directly or indirectly to the at least one transmitting party, wherein the delivering of the emergency notification content from the at least one transmitting party comprises directing the emergency notification content to only those users having a location within a predetermined proximity to an emergency for which the emergency notification content is relevant. The method also preferably further comprises: storing the emergency notification content at the device; permitting the user of the device to request specific information from the emergency notification content; searching the stored emergency notification content for the requested specific information; and displaying only the requested specific information to the user.

The method still preferably further comprises receiving location data from a 911 emergency system, the location data identifying a geographic location of an emergency, wherein the delivering of the emergency notification content from the at least one transmitting party comprises directing the emergency notification content regarding the emergency to users in the geographic location. The emergency notification content is preferably delivered to only those users by cellular or plain old telephony who do not provide an acknowledgement of receiving the emergency notification content by other means. Alternatively, the emergency notification content is delivered to only those users by cellular or plain old telephony who are within a predetermined proximity to an emergency for which the emergency notification content is relevant.

Also provided is a method for disseminating emergency notification content from an emergency originating source where the method comprises: delivering the emergency notification content from the emergency originating source to a group of users; and transmitting a verification from at least one individual user from the group of users. Preferably, the verification indicates that the emergency notification content has been received. Alternatively, the verification indicates that the emergency notification content is collaborated.

Further provided is a method for disseminating emergency notification content from an emergency originating source where the method comprises: delivering the emergency notification content from the emergency originating source to a group of users; and at least one individual user from the group of users storing the emergency notification content that has been received. Preferably, the emergency notification content is displayed from storage.

Further provided is a method for disseminating emergency notification content from an emergency originating source where the method comprises: delivering the emergency notification content from the emergency originating source to at least one transmitting party; providing an emergency knowledge database of a set of users; selecting a subset of users from among the set of users for dissemination of the emergency notification content based on at least one corresponding entry in the database; and directing the emergency notification content from the at least one transmitting party to a device corresponding to each user from the selected subset of users.

Further provided is a method for disseminating emergency notification content where the method comprises: transmitting feedback data indicative of an environmental parameter from a plurality of devices to a remote location, each of the plurality of devices being operatively connected to at least one sensor for detecting the environmental parameter; determining whether a dangerous situation has occurred based on the feedback data; if it is determined that a dangerous situation has occurred: generating an emergency notification content based on the dangerous situation; selecting a subset of users from among a set of users based on the dangerous situation; and directing the emergency notification content to a device corresponding to each user from the selected subset of users.

Further provided is a method for providing a remote medical analysis. The method comprises: detecting at least one medical parameter of a patient with at least one sensor operatively connected to a device; transmitting data corresponding to the at least one medical parameter from the device to a remote location; analyzing the data to determine a medical analysis based on the data; transmitting the medical analysis from the remote location to the device; and displaying the medical analysis to the patient.

Still further provided is a system for disseminating emergency notification content from an emergency originating source. The system comprises: first transmission means for delivering the emergency notification content from the emergency originating source to at least one transmitting party; means for selecting a subset of users from among a set of users for dissemination of the emergency notification content based on the subject matter of the emergency notification content; and second transmission means for delivering the emergency notification content from the at least one transmitting party to a device corresponding to each user from the selected subset of users; the device having a receiving means for receiving the emergency notification content from the at least one transmitting party and a display operatively connected thereto for displaying the received emergency notification content. The device can be located in a fixed or mobile location.

Still further provided is a system for disseminating emergency notification content from an emergency originating source where the system comprises: a first transmission means for delivering the emergency notification content from the emergency originating source to a group of users; and a device corresponding to at least one individual user from the group of users for receiving the emergency notification content and transmitting a verification. Preferably, the verification indicates that the emergency notification content has been received. Alternatively, the verification indicates that the emergency notification content is collaborated.

Still further provided is a system for disseminating emergency notification content from an emergency originating source where the system comprises: a transmission means for delivering the emergency notification content from the emergency originating source to a group of users; and a device corresponding to at least one individual user from the group of users for receiving the emergency notification content, the device having a memory for storing the emergency notification content that has been received. Preferably, the device further comprises a means for displaying the emergency notification content from the memory.

Still further provided is a system for disseminating emergency notification content from an emergency originating source where the system comprises: first transmission means for delivering the emergency notification content from the emergency originating source to at least one transmitting party; an emergency knowledge database of a set of users operatively connected to the at least one transmitting party; means for selecting a subset of users from among the set of users for dissemination of the emergency notification content based on at least one corresponding entry in the database; and second transmission means for directing the emergency notification content from the at least one transmitting party to a device corresponding to each user from the selected subset of users; the device having a receiving means for receiving the emergency notification content from the at least one transmitting party and a display operatively connected thereto for displaying the received emergency notification content.

Still further provided is a system for disseminating emergency notification content where the system comprises: a plurality of devices for transmitting feedback data indicative of an environmental parameter to a remote location, each of the plurality of devices being operatively connected to at least one sensor for detecting the environmental parameter; a receiving means at the remote location for receiving the feedback data from the plurality of devices; means for determining whether a dangerous situation has occurred based on the feedback data; means for generating an emergency notification content based on the dangerous situation; means for selecting a subset of users from among a set of users based on the dangerous situation; and transmission means for directing the emergency notification content to a device corresponding to each user from the selected subset of users.

Still further provided is a system for providing a remote medical analysis. The system comprises: a device for detecting at least one medical parameter of a patient with at least one sensor operatively connected thereto, the device further having a first transmission means for transmitting data corresponding to the at least one medical parameter from the device to a remote location; a receiving means at the remote location for receiving the data from the device; means for determining a medical analysis based on the data; transmission means for transmitting the medical analysis from the remote location to the device; and a display operatively connected to the device for displaying the medical analysis to the patient.

Still further provided is a device for displaying emergency notification content to a corresponding user. The device comprises: a receiver for receiving the emergency notification content from a remote location; and a display for displaying the emergency notification content to the corresponding user; wherein the device is other than a radio or television. Preferably, the device is selected from a group consisting of a set top box, a computer, a video cassette player, a DVD player, a CD player, a WebTV device, a video game player, a video game controller, a pager, a cellular phone, and a personal digital assistant. Preferably, the device further comprises a GPS transmitter for transmitting a GPS location of the device to the remote location. Preferably, the device further comprises means for automatically turning on the device to display the emergency notification content when the device is determined to be off.

The display preferably comprises a monitor for displaying a visual reproduction of the emergency notification content. Alternatively, the display comprises a speaker for displaying an audio reproduction of the emergency notification content.

Still further provided is a device for displaying emergency notification content to a corresponding user where the device comprises: at least one sensor operatively connected to the device for detecting at least one environmental parameter; a transmitter for transmitting data from the at least one sensor to a remote location; a receiver for receiving the emergency notification content from the remote location, the emergency notification content being at least partly based on the transmitted data; and a display for displaying the emergency notification content to the corresponding user. Preferably, the device further comprises means for automatically turning on the device to display the emergency notification content when the device is determined to be off.

Still further provided is a device for informing a patient of a medical analysis. The device comprises: at least one sensor operatively connected to the device for detecting at least one medical parameter; a transmitter for transmitting data from the at least one sensor to a remote location; a receiver for receiving the medical analysis based on the data from the remote location; and a display for displaying the medical analysis to the patient.

Still further provided is a device for displaying emergency notification content to a corresponding user where the device comprises: a receiver for receiving the emergency notification content from the remote location; and a transmission means for transmitting a verification. Preferably, the verification indicates that the emergency notification content has been received. Alternatively, the verification indicates that the emergency notification content is collaborated. Preferably, the device further comprises a GPS transmitter for transmitting a GPS location of the device to the remote location.

Still further provided is a device for displaying emergency notification content to a corresponding user where the device comprises: a receiver for receiving the emergency notification content from the remote location; and a transmission means for transmitting a verification. Preferably, the verification indicates that the emergency notification content has been received. Alternatively, the verification indicates that the emergency notification content is collaborated. Preferably, the device further comprises a GPS transmitter for transmitting a GPS location of the device to the remote location.

Still yet further provided is a database useful in disseminating emergency notification content. The database comprises: a first entry listing a plurality of users; and at least one second entry listing emergency information useful in directing the emergency notification content to a portion of the users, the at least one second entry corresponding to each of the plurality of users in the first entry.

Preferably, the at least one second entry comprises a listing of an address for each of the plurality of users in the first entry. The database preferably further comprises a third entry listing a geographical area corresponding to each of the users in the first entry, a known skill corresponding to at least one of the plurality of users in the first entry, a telephone number corresponding to each of the users in the first entry, and/or a wireless telephone number corresponding to at least one of the plurality of users in the first entry. Preferably, the wireless telephone number corresponds to a device selected from a group consisting of a pager, a cellular phone, and a personal digital assistant.

BRIEF DESCRIPTION OF THE DRAWINGS

These and other features, aspects, and advantages of the apparatus and methods of the present invention will become better understood with regard to the following description, appended claims, and accompanying drawings where:

FIG. 5 is a more detailed systems diagram depicting primary hardware components of a mobile EFAM Device 110a;

FIGS. 6(a)-6(c) are a detailed schematic diagram illustrating the set-top EFAN Device 110 integrated into a DBS or digital cable set-top box;

FIG. 7 illustrates the method 400 for providing emergency notification through EFAM Devices 110;

FIG. 8 illustrates the process 450 of emergency notification occurring for a local emergency; and, FIGS. 9(a)-9(c) illustrate respective of two embodiments for the mechanism 500 enabling automatic television power-up/turn-on.

DETAILED DESCRIPTION OF ILLUSTRATIVE EMBODIMENTS

Figure 1:
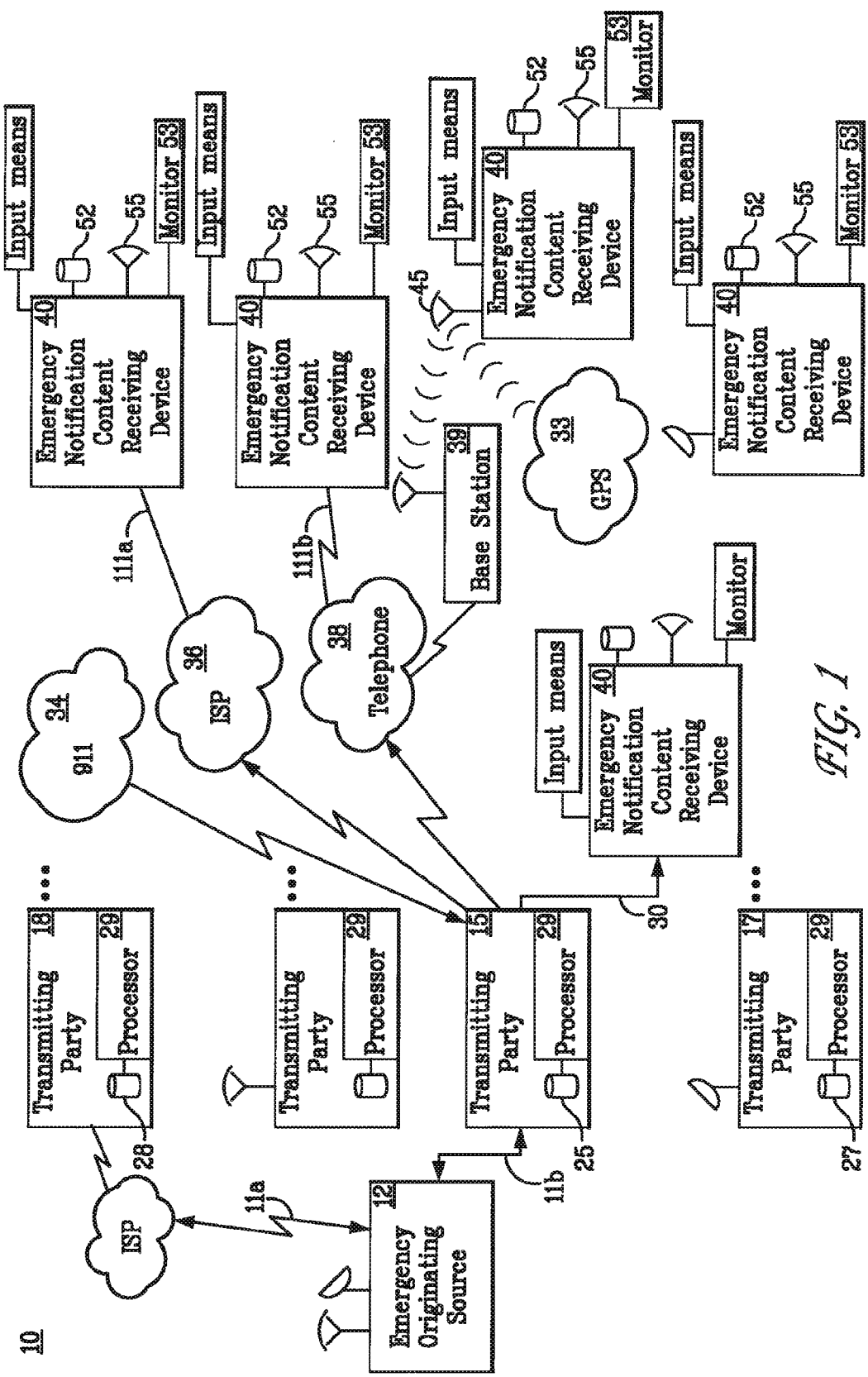
FIG. 1 is a diagram illustrating the emergency notification content delivery system according to the first embodiment of the invention.

According to a first aspect of the invention, there is provided a system and method for delivering, disseminating and viewing/listening (singularly referred to as "displaying") to emergency information from Cable Television, Direct Broadcast Satellite Systems (DBS), telephone, and Internet connections. In particular, emergency notification content is streamed or background broadcast on one or more channels to a user's set top box or personal/business computer where it is either realtime transmitted, partially cached, or fully cached. The data may also be further transmitted by any of wired or wireless means to other recording/playback and display/listening device.

Although this invention is applicable to numerous and various types of devices it has been found particularly useful in the environment of set top boxes. Therefore, without limiting the applicability of the invention to set top boxes, the invention will be described in such environment. It should be noted that the term "set top box" is broadly descriptive to any device utilized for the reception and/or transmission of Cable, DBS Or Internet signals or the information contained within those signals. As such the set top box may take the form of a dedicated consumer device such as those set top boxes previously, currently available, and planned from companies such as Pace Micro Technology, Scientific Atlanta, Motorola (General Instruments), and Sagem. In addition the set top box and its associated function of Cable, DBS Internet, or Broadcast TV reception and transmission functions may be integrated with one or more functional devices such as, personal computers, VHS player/recorders, TiVo type player/recorders, DVD player/recorders, CD player/recorders, Web TV type systems, integrated iTV receivers, video game players, video game controllers, integrated remote control stations, and all other forms and manners of integrated home media systems. Personal and business computers are those as well known within the current art including, but not limited to, IBM compatible personal computers, Macintosh computers, personal digital assistants, "Palm" handheld devices and other handheld computing devices including emergent handheld personal computers.

Within the present invention the term wireless refers to any method of communication that utilizes radio frequency or infrared communication. Radio frequency communications may be narrowband or spread spectrum, or any combination thereof. In addition the wireless connection may be a dedicated point to point link between the set top box and the DataPlay or other recording/playback device—or part of a local or wide area network, such as those based upon SWAP—Shared Wireless Access Protocol that currently operates in the 2.4 GHz band. If in a network topology the network may be a basic communications network or managed, as in the case of integrated home networking. In addition the wireless may utilize traditional, third generation, or derivative forms of cellular technology. Wired connections refer to all other means of transferring information not contained within the wireless description (for example copper wires, fiber optic, coaxial cable, etc.).

Referring now to FIG. 1, there is illustrated the emergency notification content delivery system 10 according to a first embodiment of the invention. As shown in FIG. 1, streamed emergency notification content 11a,b is realtime broadcast, transmitted or otherwise communicated from one or more emergency notification sources 12 to a Cable TV operator 15, DBS 17 or Internet Service Provider "ISP" 18 at various locations. The emergency notification content may then be locally stored in memory storage devices 25, 27 or 28 located at the respective Cable TV, DBS headend or ISP prior to continuous or periodic transmission to the viewing/listening audience. Preferably, however, the emergency notification content 111a,b is realtime transmitted to devices associated with the viewing/listening audience. The local storage of the emergency content at the Cable TV, DBS headend or Internet ISP allows continuous rebroadcast of the emergency notification content 111a,b from the location without constant retransmission from the emergency information originating source 12 to thereby ensure overall system reliability. Each of the respective Cable TV, DBS headend or ISP entities is provided with the ability to acknowledge and verify correct receipt of the emergency notification content to the providing source or sources 12. In an unlikely event that an emergency notification message is lost by the Cable TV, DBS headend or ISP, the message may be again requested from the emergency notification content source.

Each of the Cable TV 15, DBS headend 17 or ISP entities 18 are alternately referred to herein as "transmitting party" which rebroadcasts the emergency notification content to the intended audience via an associated media including, but not limited to: cable 30, satellite 33, internet 36, cellular telephone, and plain old telephony 38. Preferably, the viewing/listening audience implements devices 40 for receiving emergency notification messages directly from the respective Cable TV 15, DBS headend or ISP 18 entities via the associated media. The viewing/listening audience devices 40 include digital or analog communications devices, including, but not limited to: the set top box, a computer, a video cassette player, a DVD player, a CD player, a WebTV device, a video game player, a video game controller, a pager, a cellular phone, and a personal digital assistant. Such devices enable the display of a visual reproduction of the emergency notification content or otherwise, provide an audio reproduction of the emergency notification content.

In one embodiment, the local memory storage devices 25, 27 and 28 may comprise a shared emergency knowledge database including information for directing the emergency notification content 111a,b to at least one user from the intended audience based on at least one corresponding entry in the database. Alternately, the emergency notification content may be directed to a group of users 40 from the intended audience, all of which have the at least one corresponding entry in the database. For instance, the corresponding entry in the database may comprise a geographic location of the at least one user, or the corresponding entry in the database is a skill of the at least one user. The corresponding entry in the knowledge database may be a telephone number and the emergency notification content is directed to the users by cellular or plain old telephony system 38.

As further shown in FIG. 1, each transmitting party 15, 17, 18 is networked with or otherwise is enabled to receive communications from a "911" telephonic emergency system 34.

The information received by the transmitting party includes location data identifying a geographic location of an emergency. Thus, the emergency notification content regarding the emergency may be transmitted to users within the specific geographic location.

In a further embodiment depicted in FIG. 1, a user's device 40 may be equipped with a GPS transmitter 45 for transmitting a GPS location of the device 40 from the device directly or indirectly to one or more transmitting parties such that the emergency notification content is delivered to only those users having a location within a predetermined proximity to an emergency for which the emergency notification content is relevant. The emergency notification system knowledge base and messaging is utilized to contact those in a specific area based upon a GPS locator integrated into a user's cellular or PDA (personal digital assistant) device 40. Individuals, whether residents of an area or not, would be notified and offered local instructions to any type of emergency center or perhaps fallout shelter as necessary.

With more particularity, each of the devices 40 associated with the intended users includes a memory 52 for storing the emergency notification content, and a display device 53 for displaying the emergency notification content upon the activation of the device, for example. The device may be further provisioned with a device for permitting the user of the device to request specific information from the emergency notification content and, a device (not shown) for searching the stored emergency notification content for the requested specific information. In this manner, only the requested specific information would be displayed to the user. Besides permitting the user of the device to request specific information from the emergency notification content, it may further notify the emergency originating source of the request, and search the emergency notification content for the requested specific information so that only the requested specific information is delivered to the user. The device further comprises a mechanism for automatically turning on the device to display the emergency notification content when the device is determined to be off.

Emergency notification data is processed by processors 29 located at the Cable TV, DBS headend or Internet ISP entities so that it may be targeted according to known geographic and spatial location of a group or individual users in accordance with the information included in the emergency knowledge base. For example, in the case of the recent horrific terrorist attacks on New York City, individual households and business within lower Manhattan would be able to receive custom tailored messages. Those local to the disaster may be given directions for escape, while those that are outside the immediate danger zone may be told to remain calm and indoors so as not to impede the expedient arrival of emergency equipment and personnel to the disaster location. A further differentiation may be done directly to households within the same building—for example based upon the knowledge of the disaster or threat, proper exit instructions may be given—for example those households on the upper floors of a building may be directed to the roof for egress by helicopter as methods of escape are blocked below, whereas those on lower floors may be directed to the appropriate exits.

Furthermore, the emergency notification data may be processed according to the knowledge base and directed to households and/or individuals based upon known skills. For example, again the case of the recent World Trade Center Terrorist Attacks, Off Duty New York City Fire and Police within a given geographic local may be called to report to special operations centers. These messages might receive the highest priority and most frequent presentation to their respective households, and receive a somewhat lower priority to other households.

In yet another embodiment of the present invention, the knowledge processing base is integrated within a current 911 telephonic emergency system infrastructure 34. That is, emergency calls into the 911 system will identify a caller's location and this knowledge may be integrated into the emergency notification knowledge base and processing system, thereby adding in geographic or household targeting of emergency content. Calls into the 911 system may be further processed based upon the known emergency and an immediate automated response provided. This first level will filter out those calls that are "generic" or repetitious in nature, allowing 911 system operators to focus on those callers with new information or specific emergency needs.

The emergency notification system knowledge base and messaging system is further programmed to initiate telephone calls, via the Plain Old Telephone System (POTS) 38, those affected by the current emergency with an automated message directing them to further sources of emergency notification content, (for example Cable, DBS, Internet, Radio, Broadcast TV). Based upon the ubiquitous and pervasive presence of both POTS 38 and Cellular Phone Systems, represented by a base station 39 in FIG. 1, a much greater percentage of a given audience may be contacted and notified. The emergency notification system knowledge base and messaging system is further programmed to initiate a "page" to all of those affected by the current emergency with an automated message directing them to further sources of emergency notification content, (for example Cable, DBS, Internet, Radio, Broadcast TV). This is especially critical for emergency responses personnel and those with special skills required in case of emergency.

In accordance with the first embodiment of the present information, both generic and/or targeted emergency content is locally stored with the viewer listener household or business for viewing/listening upon viewing/listening device activation. This may be stored locally in a set top box or computer system after receipt of transmission from a Cable, DBS, Internet or Broadcast TV signal with the emergency content contained therein. As before the set top box may take the form of a dedicated consumer device such as those set top boxes previously or currently available. In addition the set top box and its associated function of Cable, DBS Internet, or Broadcast TV reception and transmission functions may be integrated with one or more functional devices such as, personal computers, VHS player/recorders, TiVo type player/recorders, DVD player/recorders, CD player/recorders, Web TV type systems, integrated iTV receivers, video game players, video game controllers, integrated remote control stations, and all other forms and manners of integrated home media systems. Personal and business computers are those as well known within the current art including, but not limited to, IBM compatible personal computers, Macintosh computers, personal digital assistants, "Palm" handheld devices and other handheld computing devices including emergent handheld personal computers. The large memory buffers contained within many of these devices can be utilized for storage of the emergency notification content.

In yet another embodiment of the present invention, the emergency content notification filter is performed with the local set top box or computer within the household or business. Full or partially targeted emergency content is received by the set top box or computer where a content filtering system displays only relevant information.

In yet another embodiment of the present invention, the emergency content notification filter is performed with the local set top box or computer within the household or business. Full or partially targeted emergency content is received by the set top box or computer where a content filtering system prioritizes the information, optionally thresholds it based upon relevancy, and displays it a frequency or periodicity optimal for the intended viewers/listeners.

In yet another embodiment of the present invention the emergency content notification filter is utilized in conjunction with devices intended to assist the disabled or physically challenged. Emergency content filtering is performed with the local set top box or computer within the household or business in conjunction with optimal reformatting for the assist device. Full or partially targeted emergency content is similarly received by the set top box or computer where a content filtering system prioritizes the information, optionally thresholds it based upon relevancy, and displays it at a frequency or periodicity optimal for the intended disabled viewers/listeners.

In yet another embodiment an interactive inquiry/response system is utilized to request specific information from the emergency information content. Since the amount of content often exceeds a human's ability to view/listen and process, the information is locally stored within the set top box or computer. The information may be also remotely stored content and accessed via the Cable Back Channel, Internet or Cable Modem, Telephone, or other method of communication.

In yet another embodiment a menu driven inquiry/response system is utilized to request specific information from the emergency information content. The emergency notification content may be locally or remotely stored.

In yet another embodiment an acknowledgement system is put in place to notify the transmitting party (Cable, DBS, Internet, Broadcast TV) that the emergency information content has been correctly received or to re-request information. If acknowledgement is not received on a timely basis it may be automatically retransmitted.

In yet another embodiment of the present invention a viewer listener acknowledgement is integrated within the present 911 systems or any other means of emergency command and control stations or centers. In this scenario the intended viewer listener notifies the transmitting party, 911 system, or any other emergency command and control station or center that the emergency information has been received.

In yet another embodiment of the present invention a method of signaling is utilized by the emergency notification broadcaster to turn-on a viewing or listening device and set the operational controls to a state sufficient to catch the attention of any viewers/listeners within the household, business, or other local. For example, with cable type set top boxes an AC outlet is often provided for TVs and other appliances. Since TVs and other display/listening devices often default to acceptable operating levels the cable box can simply power-up the TV which is always left in an on-state. Control functions may also be integrated with wireless (infrared) remote controls and other such devices currently in use.

In yet another embodiment future enhancements to set top boxes, computers, radios and other playing/listening/recording devices may allow for remote emergency notification command/control where an activation message turns on the appropriate appliances and commands them into a known, appropriate state. This feature is a highly desirable selling feature for new set top box, computer, and consumer appliance marketers. In yet another embodiment of the present invention survey information is filled out and provided to the Cable, DBS, Internet, Broadcast TV, Radio or other emergency content transmitter for use in a remote emergency content knowledge base and processor. Alternately, survey information may be filled out and stored locally in the set top box or appliance for use in a local emergency content knowledge base and processor. Further, survey information may be filled out and provided to the Cable, DBS, Internet, Broadcast TV, Radio or other emergency content transmitter for use in a local emergency content knowledge base and processor on a download/upload basis.

In yet another embodiment of the present invention the prestored information on a local set top box or computer for emergency notification is activated for viewing/listening. For example emergency egress plans for leaving locations near nuclear power plants may be displayed upon appropriate activation by the Cable, DBS, Internet, Broadcast TV, Radio or other emergency content transmitter for more prompt notification.

In yet another embodiment of the present invention the emergency content utilizes headers for identification of data in routing, for processing by remote and local emergency knowledge bases, and for routing emergency notification content to individual viewers/listeners.

It should be noted that according to the first embodiment of the invention, a methodology is provided for broad notification to a wide audience, with personalized targeted specific targeted messages to all viewers. For example, it is quite feasible to reach 500,000 to millions of viewers with 10K byte messages in minutes or less. It should be further noted that the system, as described is capable of verifying the response and status from each household to ensure the welfare and safekeeping of all individuals notified by the emergency notification system.

The system described in accordance with the first embodiment of the invention depicted in FIG. 1 may be enhanced with a data collection system in which discretely addressable devices at locations such as homes, businesses and vehicles are equipped with the ability to sense at least one environmental/physical measurement, initiate an alert notification at that sensor location when applicable, and transmit data indicative of the measurement to a host facility (host computer) which, in turn, is in communication with various governmental agencies, local emergency personnel, or medical facilities, and the like. The data is then used to both tailor an appropriate emergency notification message and deliver that message in the manner as described herein. Such an enhanced system is referred to herein as the Emergency Feedback and Notification (EFAN) system. The discretely addressable devices at locations such as homes, businesses and vehicles equipped with sensor(s) are referred to herein as EFAN devices.

Figure 2:
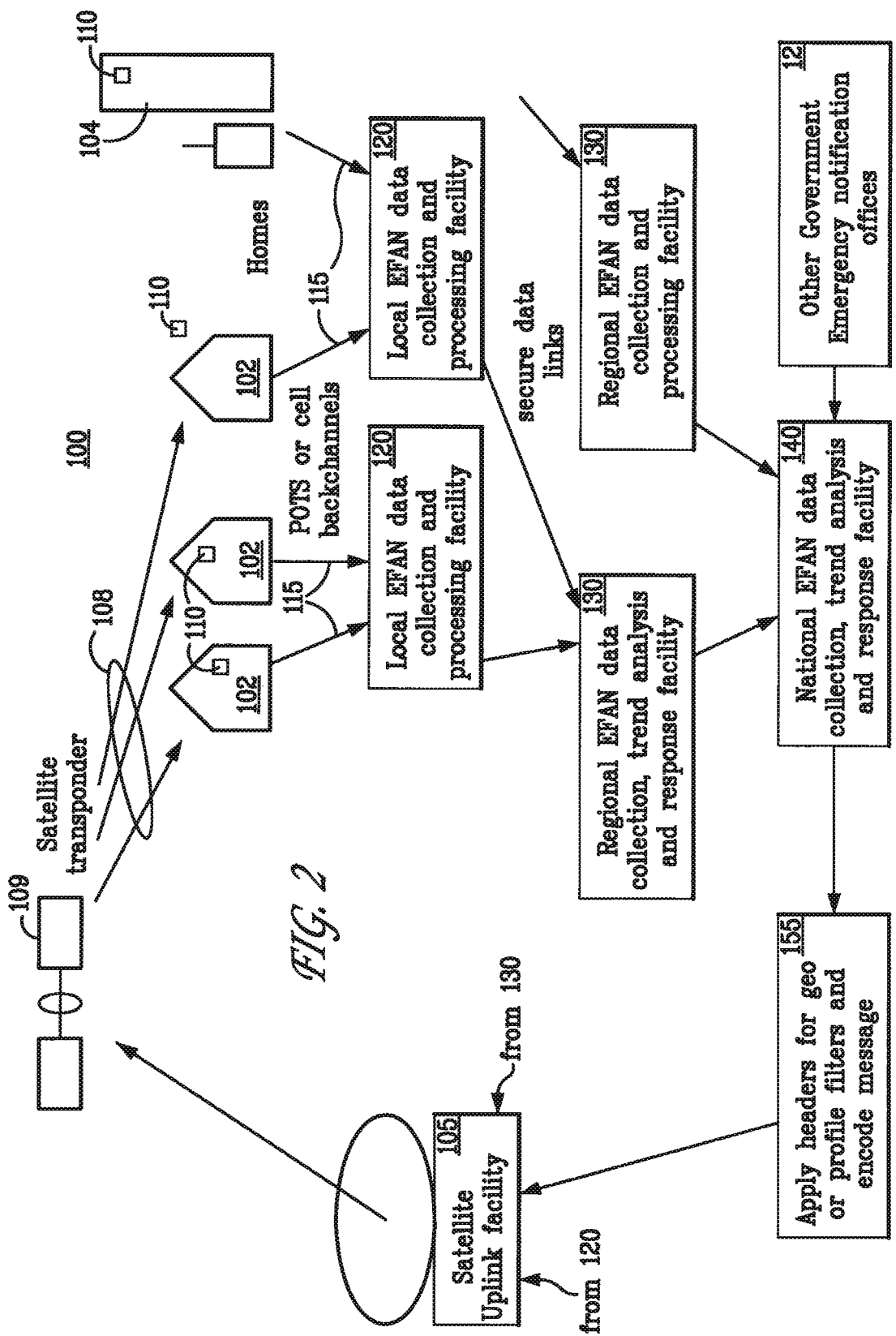
FIG. 2 is a general schematic diagram of the Emergency Feedback and Notification system (hereinafter "the EFAN system") 100 according to a second embodiment of the invention.

FIG. 2 illustrates a general schematic of the EFAN system 100 according to a second embodiment of the invention. As shown in FIG. 2, a plurality of EFAN devices 110 provided at selected locations such as residential homes 102, office buildings 104, stores, etc., are equipped with at least one sensor for detecting at least one environmental measurement and, more preferably, equipped with an array of sensors for detecting a plurality of environmental measurements. Such measurements may include temperature (e.g., either high or low extremes), radiation (e.g., neutron and high energy nuclear particles), toxic chemicals and gases (e.g., industrial chemicals and military gases such as Sarin), biohazards, gases (e.g., carbon monoxide, methane, propane or natural gas), smoke, water and air quality, humidity, shock (from a blast, a tornado, or earthquake) and pressure. Many of the sensors necessary to detect these parameters are known in the art and are preferably included in the device, on the device, or external to the device, for instance mounted to a wall, ceiling, or in the plenum of a heating, ventilation and air conditioning system, at an appropriate place, and communicate with the EFAN device by a wired or wireless link. The sensors in the device are preferably part of an air intake and sampling system having an array of sensors in direct contact with an airflow stream inside the device or within an intake tube driven by a small fan. In a preferred embodiment, the EFAN devices 110 are capable of gathering local conditions at a site with sensors that measure, for example, temperature (fire), acceleration (explosion), radiation or other toxic gases and, are enabled to transmit the data to remote locations by data communication links 115 such as cable, telephone, satellite, RF transmission and cellular communication systems. Preferably, EFAN Devices 110 process this information for factors such as magnitude or rate of change, and convey this information via links 115 to a Host Facility 120 when thresholds are reached or when instructed to communicate data by the Host Facility. Host facilities are depicted in FIG. 2 as the local 120 EFAN data collection and processing facilities where the data is processed in the manner as will be explained.

As will be explained in greater detail herein, the EFAN device 110 is preferably an interactive television set-top box that receives cable and/or satellite transmissions, or resides in televisions or vehicles. In the description of certain preferred embodiments herein, the terms "set-top box" and "interactive set-top box" are used to refer to the preferred form of these EFAN devices. In other embodiments, the EFAN device 110 may be incorporated in a personal computer, a cellular phone, personal data accessory (PDA), or a radio. The EFAN device may be fixed in a structure such as a residence, commercial building or in a mobile vehicle, such as an automobile, boat, or airplane.

More specifically, central blanket broadcasting to units in houses may further be accomplished by satellite (DBS) 109, cable, TV, radio or any element of the emergency broadcast network 10 of FIG. 1. Headers provided on messages and filters in EFAN Devices 110 restrict display of messages to appropriate clients. Back-channels (POTS or cell phone) 115 permit responses or sensor information from selected houses to be communicated back to a "host facility" which may include local 120, regional 130 or national 140 EFAN sites. Each host facility is a central data compilation and processing station programmed to monitor data trends and assess emergency situations. Responses to emergency or general messages are sent by the appropriate central stations to a blanket cable or broadcasting system 109 via an uplink facility 105 for DBS. As is understood, the system 100 also functions with conventional cable broadcasting with emergency notification information delivered to the cable head end (not shown). Messages 108 to be communicated to individuals or groups of households 102 via blanket broadcasting system 109 are transmitted along with a description of the intended households. Messages 108 may be information for immediate communication, information to be stored by an EFAN Device 110 for later display or, control signals that instruct the set-top box unit when or under what conditions it should communicate via the back channels 115 with host facilities 120. Filter devices provided in each household set-top box receiver allow selection of messages only intended for specific households at specific locations (e.g., eastern Virginia) or, specific households based on profiles (e.g., National Guardsmen, doctors, elderly) that receive messages with headers that match their filters. Messages may also be encoded by encoding device 155 to prevent unauthorized persons from receiving a particular message. Each header and message is sent in digital form to a satellite uplink facility 105 (or to other selected blanket broadcasting systems such as the NWR (National Weather Radio) or radio stations) and are blanket broadcast by that broadcasting facility 109 to all EFAN Devices 110. Each Device 110 communicates appropriate messages to members of the household, e.g., by the household's television.

As information is collected at host facilities 120, 130 and 140, operators, or automatic analysis systems provided at the central data compilation and processing station, analyze trends and coordinate with local emergency services, e.g., a fire company, or pass this information to regional centers or, pass additional messages to the units within their area either by high or low bandwidth channels in accordance with the techniques of the emergency notification content delivery system of the invention described herein with respect to FIG. 1.

Figure 3:
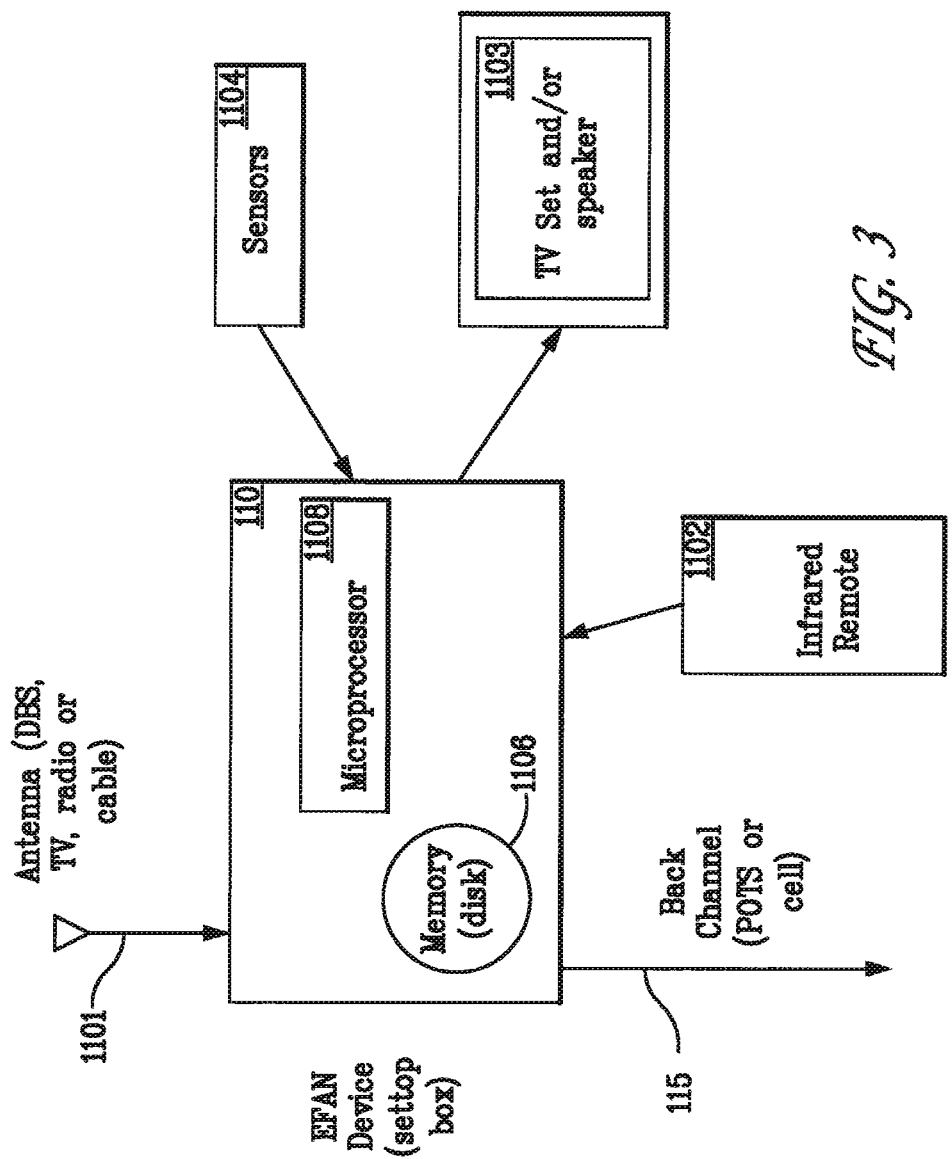
FIG. 3 is a schematic illustration of the EFAN Device 110.

As shown in FIG. 3, each Device 110 includes a high bandwidth input that may comprise a DBS, a TV or a cable receiver 1101 and, a lower bandwidth backchannel comprising a POTS or cell phone link 115 to a central data compilation and processing station (host facility 120, 130, 140). The unit both displays messages (video, audio or text) received via the high bandwidth input or triggered from memory via the monitor or TV device 1103. The EFAN Device 110 receives data in the following manner: 1) via user input, e.g., wirelessly such as provided by IR remote device 1102; and, 2) via sensor devices 1104. Upon command or, upon detection of an alert condition, the data and information it contains, or a processed form of this information may be sent to a central data compilation and processing station.

Additionally, as shown in FIG. 3, each EFAN device 110 further includes both non-volatile storage 1106 (e.g., a hard disk) for accumulation and temporary storage of sensor data, profile filters or messages, and, a microprocessor 1108 to control the flow of data through the system. The EFAN device includes high bandwidth receivers and antennas 1101 for reception of messages or control commands and sensors 1104 for monitoring local environmental or other physical conditions. As will be described in greater detail, sensor devices may include, but are not limited to: radiation or chemical sensors, e.g., for detecting radiations levels or to track the plume of a local leak, particle sensors (e.g., for detecting smoke), temperature sensors (for detecting fire or freezing conditions), accelerometers (for detecting earthquake or bomb explosion) or, photometers for sensing ambient or local light levels. In further view of FIG. 3, household members preferably receive information via a TV set or like display monitor connected to the device 1103. The TV may be turned on and have it's channel adjusted by the device 110. The handheld IR remote 1102 enables user input via ITV and by related methods known in the art. The back channel allows the device to communicate its gathered information to the host facility on pre-arranged schedules, upon request or upon a sensor measurement parameter exceeding some threshold.

Figure 4:
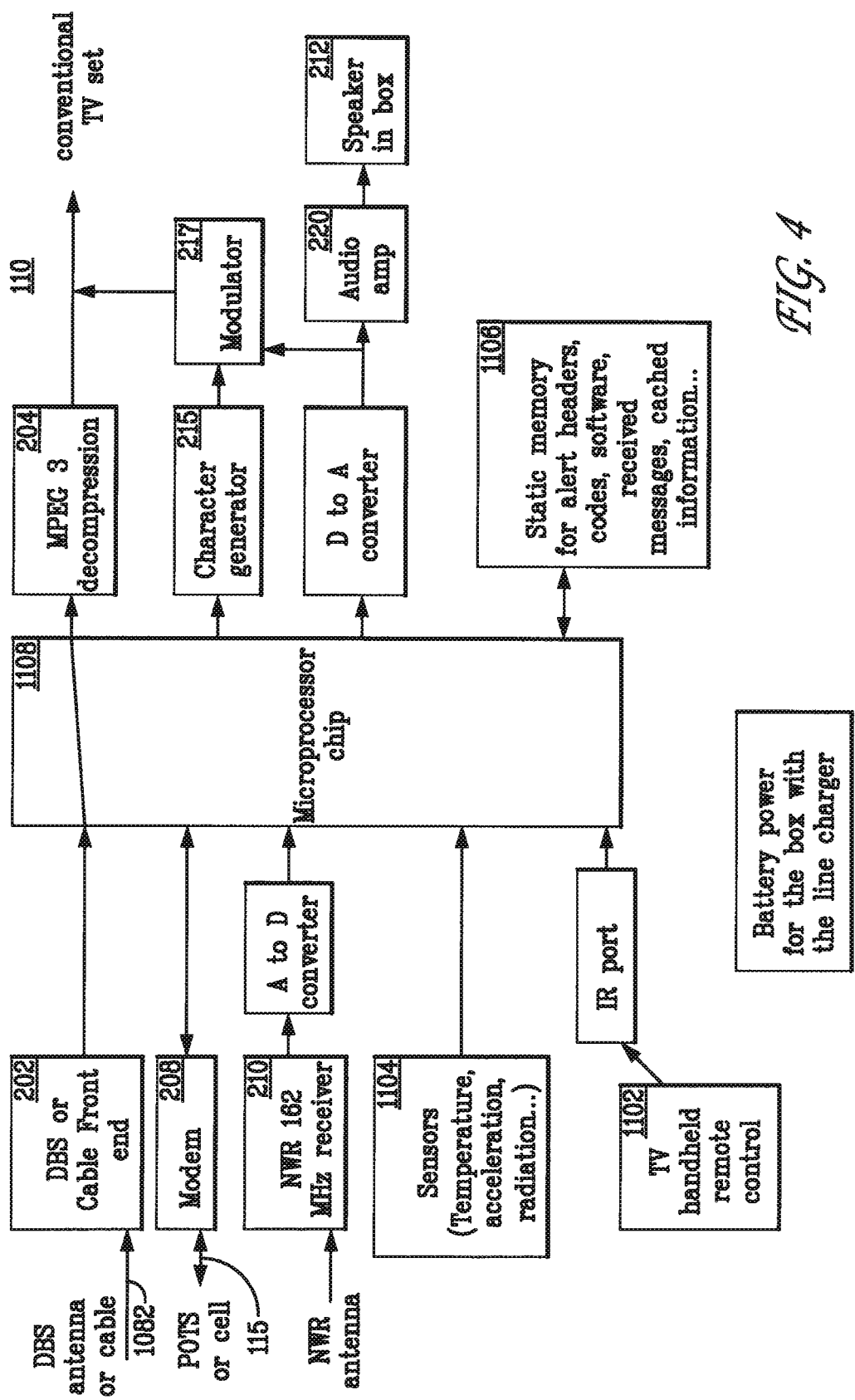
FIG. 4 is a more detailed systems diagram depicting primary hardware components of the set-top EFAN device 110.

FIG. 4 is a more detailed systems diagram depicting primary hardware components of the set-top EFAN device 110. As shown in FIG. 4, a cable or DBS signal 1081 is converted to a digital bitstream by a front end receiver 202. The system microprocessor 1108 selects packets out of cable/DBS bitstream for normal decompression, monitors bitstream for alerts, monitors EFAN receiver for alert, and communicates characters, during an alert condition, to character generator 215 and modulator 217 for synthesizing voice signals to be amplified by amplifier 220. More specifically, the device microprocessor 1108 examines the headers of each message or data packet, appropriately responds to control commands in the packet or, forwards the packet contents to a decompression engine and either stores the packet in memory for future use or discards the packets that do not conform to the current channel or EFAN device. The output of the decompression engine may additionally be sent to a conventional TV. Information may be stored in a flash memory or, a conventional hard drive. The microprocessor 1108 additionally receives information from sensors 1104 whose output may be in digital form, such as the Dallas one-wire temperature sensor series or, may be in analog form with appropriate analog to digital conversion being performed internal or external to the microprocessor 1108. In addition to streaming bits, the microprocessor 1108 may additionally generate text or speech messages, or images required for ITV use of the system. The microprocessor also operates and sends and receives messages through the backchannel 115 via a conventional POTS modem 208 or like interface device. An NWR (National Weather Radio) 162 MHz receiver 210 optionally provides redundant emergency alerts signals or other information to the system. Interactive TV functions provide users with the ability to select and display information needed to cope with an emergency such as detailed maps, descriptions of safety measures to be taken, or even copies of messages sent previously before the user was present. User interactive selections and choices are communicated to the device 110 from the handheld IR remote 1102 much like the remote used for TV systems. In the future it is likely that the interactive functions may be communicated to the device by means of voice recognition technology. The device 110 additionally includes an internal speaker 212 to function as both an alarm and provide output to a user in the event their TV or monitor display capability is damaged or inoperable. Speech may be synthesized by the microprocessor. The device is powered by rechargeable batteries allowing reception and communication of emergency information in the event that AC power is lost. Microprocessor 1108 additionally is programmed to manage the storage of unviewed or ITV verbal material and initiate authenticating and decrypting functions when necessary.

Figure 5:
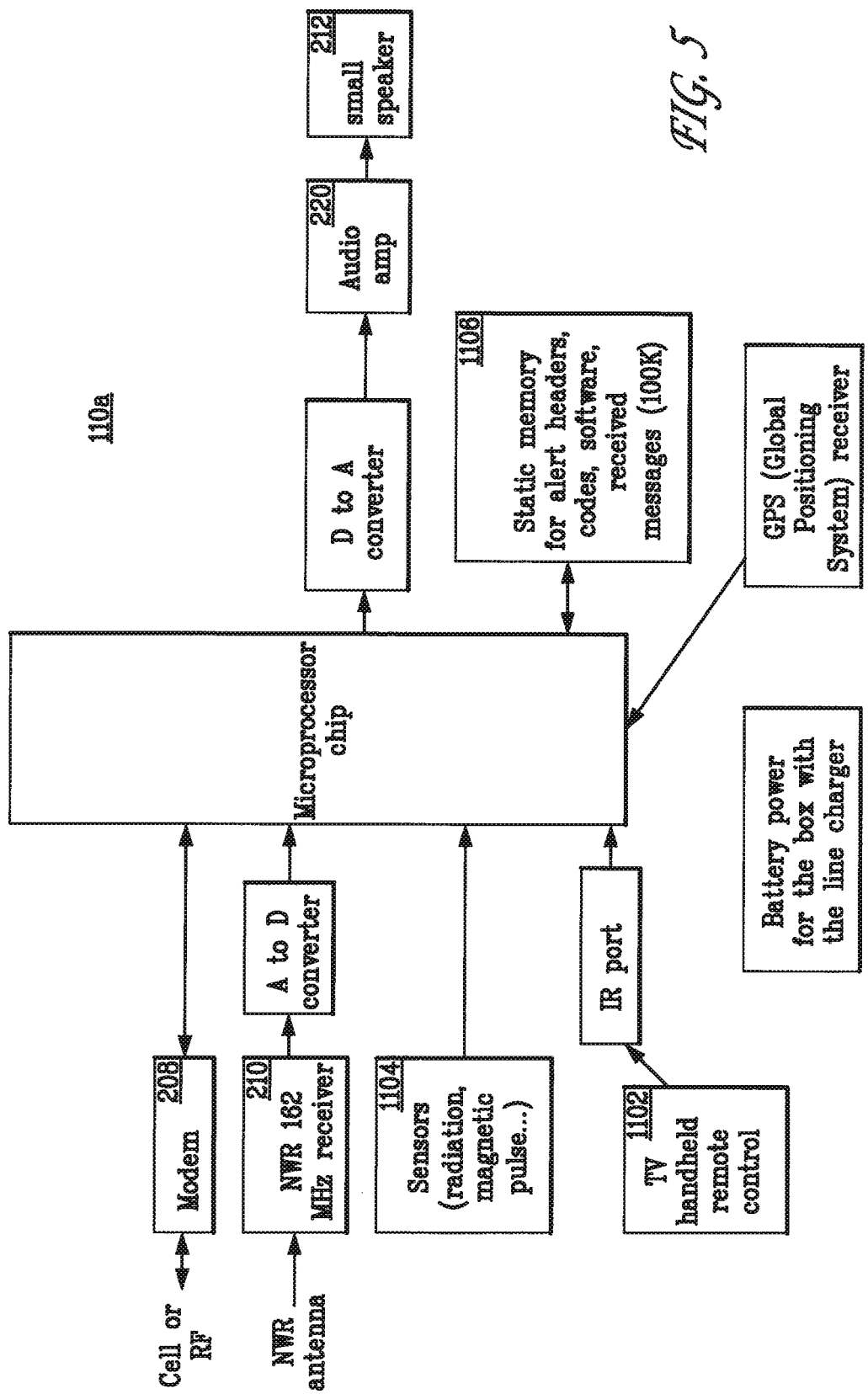

FIG. 5 is a more detailed systems diagram depicting primary hardware components of a mobile EFAM Device 110a for use in automobile or, other vehicles. As shown in FIG. 5, the NWR receiver 210 provides all incoming emergency information, which may be augmented by satellite or RF reception as available in modern automobile sound systems. This portable EFAN device 110a may additionally include a GPS receiver 225 to provide specific information about current position of the automobile either for the purpose of filtering only headers that apply to the automobile's exact location, such as a notification of proximity to a nuclear plant, or, to communicate the automobile's position to EMS management teams using data from the sensor system, for example radiation or electromagnetic pulse signatures. Back channel communication from the device 110a to a host facility may additionally be accomplished via cellular radio or an RF link. The microprocessor 1108 monitors the NWR receiver 210 for alert, and communicates during alert including synthesizing voice, conducting modem communications through a cell or RF connection and, communicating with the handheld remote 1102.

Figure 6A:
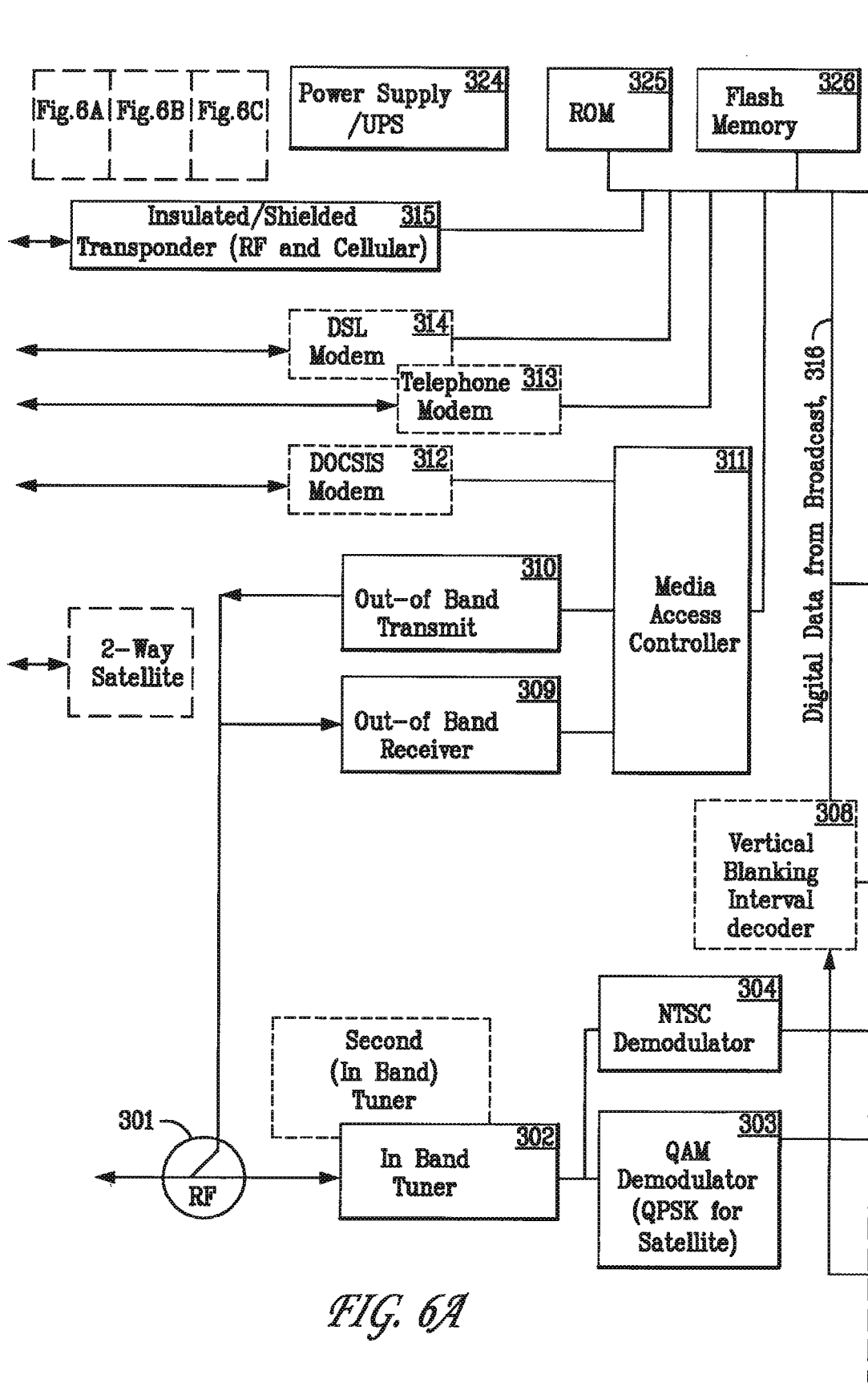
Figure 6C:
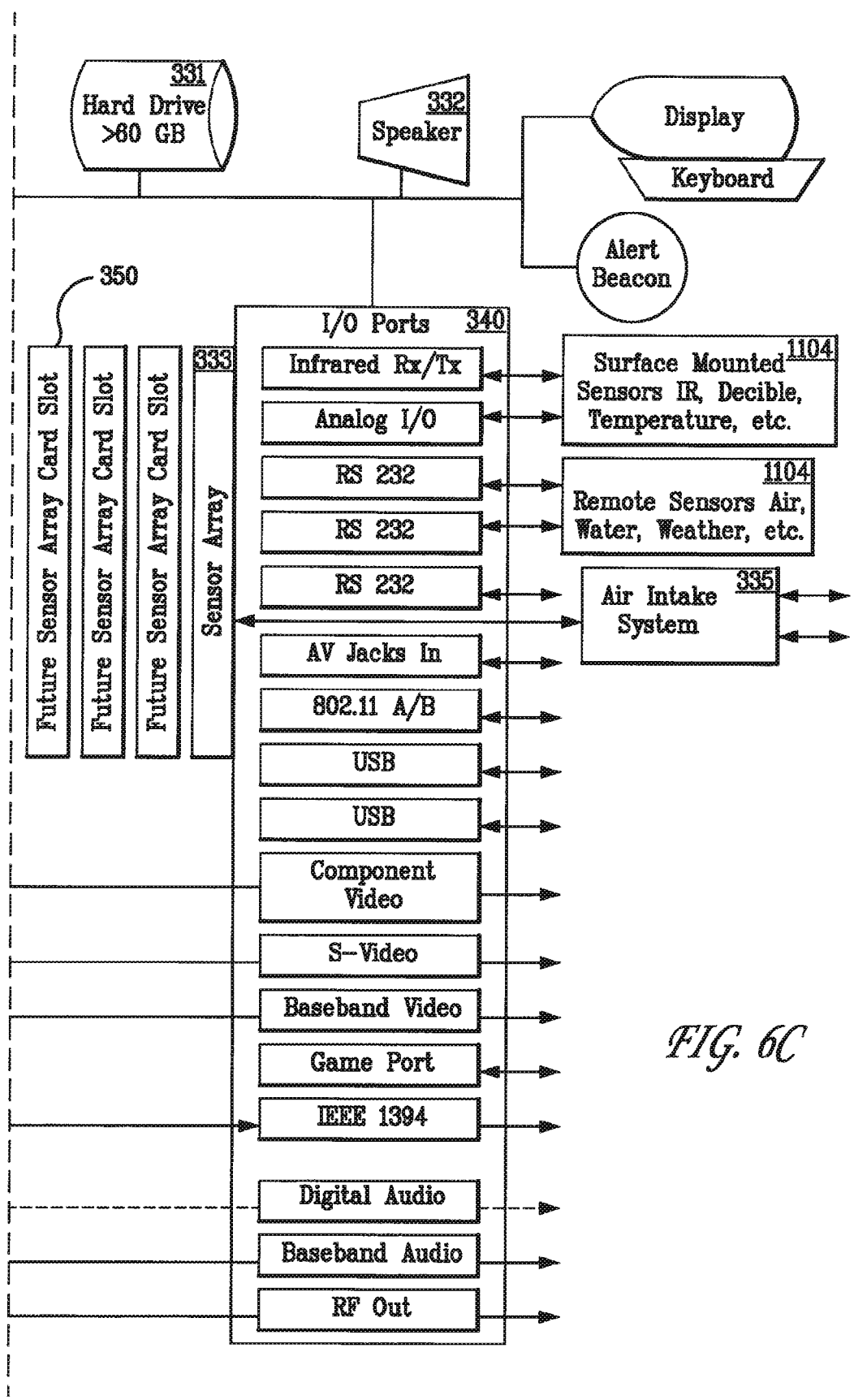

FIGS. 6(a)-6(c) are a detailed schematic diagram illustrating the set-top EFAN Device 110 integrated within a standard DBS or digital cable set-top box 300. As shown in FIGS. 6(a)-6(c), the various components include: a digital input (linear broadcast and data) via RF coax 301; an RF Tuner 302 (second tuner for multi-tuner applications such as PVR); a QAM Demodulator 303 (i.e., as satellite is usually modulated using QPSK—a QPSK demodulator will be required for satellite application); an NTSC decoder 304 is required to support reception of analog channels from cable systems; a Stereo signal decoder 305; an MPEG2 transport layer and decoding unit 306; an analog descrambler 307 for support of scrambled, analog broadcast signals; a Vertical Blanking Interval decoder 308—for data encoded in analog signals such as close captioning and low-bandwidth data; an Out-of Band Receiver 309 for receiving RF data over an alternate (out-of band) frequency; an Out-of Band Transmitter 310 for transmitting RF data over an alternate (out-of band) frequency; a Media Access Controller 311—enabling point-to-point access to each customer STB; a DOCSIS modem 312 for enabling Cable 'internet' access from the STB to CMTS (cable modem termination systems) at the cable and/or satellite head-end and providing high-speed point-to-point access to each customer STB; a Telephone modem 313 for enabling POTS (plain-old telephone) access from the STB to cable and/or satellite STB and providing 'low-to-medium' speed access to each customer STB; a DSL modem 314 for enabling Digital subscriber link access from the STB to cable and/or satellite head-end via DSL telecomm provider facilities and providing high-speed access to each customer STB; an Insulated/Shielded Transponder 315; Data 316 from analog and digital broadcasts is made available to the CPU for application processing; an AC-3 decoder 317 for receiving encoded AC-3 stereo content and generating digital/baseband audio output; an MPEG-2 decoder 318 for extracting MPEG-2 audio/video and data and, additionally processes any graphics overlays generated via broadcast or STB application; a secure microprocessor 319 for support of descrambling analog audio/video and VBI data; a RAM 320 used by graphics decoder; an NTSC encoder 321 for creating analog video output from the STB; an IEEE 1394 or 'Firewire' interface 322 for receiving/transmitting audio/video signals; an RF modulator 323 for producing RF (coax) output of audio/video signals; a power source 324 including an uninterruptible power supply; a ROM 325 providing read only memory with stored data/programs; a FLASH memory 326 which can be 'flashed' to change contents and is capable of being changed by cable/satellite operator as needed; an NVRAM memory 327 which retains settings across power-down/power-up and, can be changed by the STB application; a RAM memory 328 which does not retain settings at device power-down/power-up, and used by STB and STB applications for storing temporary data; the CPU 329 which is the primary STB processor; a Slot 330 for connecting DVD/CD devices; a Hard drive 331 used for storing long term audio, video and data; Speaker 332 for providing audible signals to the customer; a Mag/Optical/Smart-Card Swipe mechanism 339 providing capability for transacting credit-card commerce via the EFAN set-top box, and for recognizing and identifying users having identification badges or the like; and, an Internal array 333 of sensors. As shown in FIGS. 6(a)-6(c), the internal array sensors in the device 110 are preferably part of an air intake and sampling system 335 having an array of sensors in direct contact with an airflow stream inside the device or within an intake tube driven by a small fan.

It should be understood that very few additional components are required to provide EFAM capability to a set-top box: notably, sensor inputs and, in one example, and an optional NWR receiver. A set-top box variation provides a more robust back channel through the use of a shielded RF or cellular transponder 315. Preferably, the EFAN device 110 has a number of I/O ports 340 and interfaces 350 available for the addition of remote and surface mounted sensors 1104 whether available now, or in the future.

The range of commercially available sensors 1104 that might be connected to an EFAM Device 110 include: sensors internal to the EFAM Device 110 such as barometric pressure, acceleration or temperature, or remote sensors located outside of the EFAM Device such as a smoke or carbon monoxide sensor located remote from the EFAM Device, e.g., in a location where smoke would more likely be detected. Connections between the Device and sensors are accomplished through conventional connections, wired communication protocols or wireless protocols. The range of sensors at a particular location could be included as standard or optional parts of the EFAM Device. For example, all Devices might have a radiation sensor, but only some devices may be provided with an IR sensor and emitter pair functioning as an intrusion or burglar detection alarm. In certain other situations, special robust sensors may be used to collect data that can be used to analyze emergency situations after they have occurred such as pressure lows during a tornado or peak temperatures during a fire. Communications to the EFAM Device may be standardized allowing transmission of common medical parameters such as blood sugar level or electrocardiograms from appropriate pulmonary or electrocardiogram sensor inputs.

In one embodiment of the present invention, hardened sensors and communications systems are utilized at some or all of the sensing location within the Emergency Feedback and Notification System 100. For example, a simple high temperature sensor and transmitter (or other electronics), preferably fabricated from wide energy bandgap semi-conductor material such as silicon carbide, GaN, GaN fabricated epitaxial layers grown on silicon carbide, InGaN or InGaN fabricated on GaAs, aluminum nitride, and GaN deposited on Si (each with or without appropriate buffer layers), or, in certain embodiments, devices fabricated in Si or GaAs, and may be housed in a temperature hardened package within the set-top box. Additionally, gallium arsenide, which has a wider band gap and a higher electron mobility than silicon, may be used to fabricate the transmitter or components thereof to provide a higher temperature capability than silicon and can also provide, because of its piezoelectric properties, a substrate capable of on-chip small acoustic wave (SAW) sensors capable of detecting volatile organic compounds, explosives and other chemical agents. The temperature sensors may be fabricated utilizing high temperature resistors, capacitors, wide band gap semi-conductor materials or high temperature light emitting devices coupled to high temperature light detecting devices. This device can be independently powered by a long life, high temperature battery, capacitor, or other energy storage device. If the set-top box can no longer transmit or receive acknowledgment of its transmission, an RF, cellular or other link may be employed. Alternately, these other links may be employed as the primary means of transmission or as a redundant means.

Hardening may also be performed against other environmental factors using the sensor and transmitter materials discussed above. In another embodiment of the present invention the sensor/transmitter assembly is hardened against one or more nuclear effects such as latch-up, transient dose, total dose, and electromagnetic pulse. Additionally, because of the more global nature of these types of threats these types of sensors may also be distributed geographically. Hardening against other environmental factors is also possible including wide temperature variations, shock, acceleration, vibration, and mechanical damage. The sensors used with the devices of the present invention may be any sensors now known or later developed that measure or detect environmental parameters.

With respect to preferred types of sensor devices 1104 that are compatible with the EFAN system, the following sensor devices will now be described. The following discussion of sensors is given by way of example only and not to limit the scope or spirit of the present invention.

Remote chemical sensors may be implemented for detecting vapors of various kinds, including household gases (methane, propane, carbon monoxide), organic contaminants (volatile organic compounds or VOCs), and chemical warfare agents. One example of a small, solid state sensor 1104 that may be used to detect a variety of gases is the TGS sensor marketed by Figaro USA Inc. These sensors use a thick metal oxide film (typically $SnO_2$) as the sensing element. Upon heating, the sensor adsorbs oxygen at the grain boundaries. When gas (other than oxygen) is present, the resistance of the metal oxide film is reduced by adsorption of reducing gas at the grain boundaries of the film, which lowers the electrical potential barrier. The resistance R (which is the range of 1-10 $k\Omega$), depends upon the gas concentration C as $R=AC_{-\alpha}$, where A and $\alpha$ are constants. This relationship is reliable over ranges of gas concentration from approximately 300 ppm to 30,000 ppm, depending on the gas. Load resistances for readout of the signal should be in the range 1-10 $k\Omega$, with optimum sensitivity obtained when load and sensor resistance are equal. The sensor is to be incorporated in a simple temperature-compensated comparator circuit or microprocessor. The output voltage for such a circuit would typically be in the range of 1-5 V, and a preset signal level may be used to activate an alarm circuit. The sensors are stable over times of between one and two years, if a constant heater voltage is maintained and water condensation is limited to the light condensation to be expected in an indoor environment. The sensor element (with encapsulated heater) is 9 mm in diameter and 8 mm in height. Sensors calibrated for propane, methane, hydrogen, carbon monoxide, carbon dioxide, ammonia, hydrogen sulfide, alcohol/toluene/xylene, and other VOCs are available.

Another example of small, solid state gas sensors that could be used in this application is the Cyranose 320 developed by Cyrano Sciences. It is based upon a sensor technology called polymer composite sensors that has been licensed from the California Institute of Technology. It includes an array of 32 sensors, each of which consists of a pair of electrical contacts that are bridged by a composite film. Typically the film for each sensor is made of a composite of a non-conducting polymer and conductive carbon black particles. When the film absorbs vapor analytes and swells, the conductive pathways in the film are broken and the resistance of the composite film changes. The change in resistance between the electrical contacts is used as the output of the sensor. Since each sensor in the array contains a unique polymer, there will be a reproducible combination of resistances or "smellprint" for each vapor mixture. Polymers with a range of properties were chosen so that the sensor array could be used to distinguish many different types of vapors. The organic compounds are identified using data analysis algorithms such as principal component analysis (PCA) for detection of outliers and K-nearest neighbor (KNN), Soft Independent Modeling of Class Analogy (SIMCA), Fisher Linear Discrimination (FLD) and Canonical Discriminant Analysis (CDA) for model building and predictions. Typical detection limits are 0.1% of an analyte's vapor pressure, which translates to a detection limit of 74 ppm for ethanol, but only 0.5 ppm for nonanalytes.

Another similar sensor technology under development at Sandia National Laboratory, which consists of a large array of chemical sensors with responses interpreted using a patternrecognition algorithm, may discriminate a variety of chemicals. Chemiresistors, which change resistance when exposed to a gas or vapor, are low-cost devices that may be easily implemented in a sensor array 333. These devices include interdigitated electrodes coated with a conducting polymer film. Development scientists at Sandia are examining a number of polymer/conductive particle combinations as chemiresistor materials. These sensors utilize arrays of chemiresistors based on species-specific polymer films that provide real-time, in situ analysis of VOCs.

The Small Acoustic Wave (SAW) sensors being developed at Sandia National Laboratories is another example of a solid state sensor. The SAW device is an extremely sensitive gravimetric detector that may be coated with a film to collect chemical species of interest. Based on these devices, sensor systems have been developed that may detect trace (ppm to ppb) levels of airborne contaminants. One approach to realizing a miniaturized, low-cost sensor system is to construct on-chip acoustic sensors—providing high gravimetric sensitivity—and combine these with on-chip control electronics. The piezoelectric and semiconducting properties of gallium arsenide (GaAs) substrates enable surface acoustic wave sensors to be constructed with on-chip control electronics. Working with Sandia's Compound Semi-conductor Research Laboratory (CSRL), development scientists have constructed SAW sensors on GaAs that operate between 100 and 450 MHz. Development of the on-chip control electronics is currently under way.

Another example is the Integrated Acoustic Chemical Sensor, which consists of a micro-machined flexural plate (FPW) wave device (with a chemically-sensitive film) and serves as a general purpose chemical sensing platform. These devices are analogous to the SAW sensor, but may be fabricated on silicon and integrated with microelectronics. Potential applications include detecting volatile organic compounds, explosives, illicit drugs, and chemical warfare agents.

Methods of environmental sensing of hazardous biological species such as bacteria are not yet as well developed as for chemical sensors. However, some highly promising technologies have been proven, and may be adaptable in the near future for use in hazard monitoring. A multifunctional "biochip" developed at Oak Ridge National Laboratory and licensed to HealthSpex may detect the presence of the tuberculosis bacterium, the anthrax bacterium used in biological warfare, and Escherichia coli found in contaminated food. The device consists of a series of miniature cantilevers (produced using semi-conductor processing technology) that are coated with a layer of molecules that chemically bind to the biohazard target. The binding of the target entity causes a bending of the cantilever, which may be detected optically using a small diode laser and a photosensor. Such devices have not yet been made functional for airborne hazards, but the technology is under further development.

A related technology developed at the Univ. of Wisconsin uses liquid crystal molecules loosely bound to receptor molecules. In the absence of a contaminant, the liquid crystal orientation is controlled by its binding to the receptor. When a contaminant is introduced, it binds strongly to the receptor and the liquid crystal molecules are released, changing the optical properties of the sensor. A light source (such as a small diode laser) and a photosensor may provide the signal indicating the presence of the biohazard.

Ionizing radiation is generally of four types: alpha particles ($^4$He nuclei), beta particles (high-energy electrons), gamma rays (high-energy photons), and neutrons. All may be produced by radioactive decay of nuclei, and all are capable of producing harm to humans.

Neutron and gamma-ray sensing may be accomplished using flexible fiber optic sensors developed at Pacific Northwest National Laboratory (PNNL) and licensed to Canberra. These fibers are made of a neutron- or gamma-scintillating glass, and detection is accomplished by monitoring the light produced in the fiber with a conventional photodetector. The signal size discriminates between neutrons and gamma rays, and the signal rate indicates the dose rate. A single fiber or multiple fibers may be used, depending on the expected dose rate. Because the fibers are flexible, they may be deployed in multiple locations such as in window frames.

Ionizing radiation of all kinds may be detected using the FET-based radiation sensor developed at Sandia National Laboratory and at the NMRC in Ireland. The radiation-sensitive field effect transistor (RadFET) uses a gate oxide/nitride layer to permanently trap holes generated by ionizing radiation. This results in a shift in threshold voltage that indicates the total radiation dose received. The rate of threshold voltage shift indicated the dose rate. Typical operating currents are approximately 10 µA. Devices with radiation sensitivities of >85 mV/rad have been demonstrated using stacked devices, with pre-irradiation output voltage of <5V possible. A simple alarm circuit may be constructed to be triggered when a preset dose is accumulated. A coarse-resolution radiation spectrometer has been constructed from arrays of RadFETs with metal filters that pass different energies.

Scientists at Lawrence Livermore National Laboratory have developed a high-sensitivity Ge detector that is capable of identifying the energy signatures of various types of radiation at the sub-picocurie level. Low concentrations of specific elements or radioactive isotopes may then be easily identified. The laboratory is seeking industrial collaborators to commercialize such low-level radiation detectors.

Other technologies that may be adapted for this use have been developed in the context of elementary particle physics. The development of sensor modules for measuring elementary particles makes great demands on leading-edge expertise. SINTEF (The Foundation for Scientific and Industrial Research at the Norwegian Institute of Technology) has developed a silicon microstrip radiation sensor consisting of 387 strip diodes that are processed with a pitch of 50 µm on a silicon chip. When an elementary particle strikes the sensor, a charge pulse occurs in the channels which are closest to the strike point. Similar technology could be used to detect low levels of hazardous radiation.

The COMRAD system developed at Sandia also holds promise for such applications. It uses a CdZnTe crystal to perform spectral analysis of X-rays and gamma rays to identify radioactive species. The device operates at room temperature and requires low enough power that it may be operated as a hand-held unit. However, limitations in the size of the available CdZnTe crystals prevent this device from detecting low levels of airborne radioactive species at present. Further developments in crystal growth techniques will make this technology more viable for environmental monitoring.

Small electronic dosimeters using thin layers of amorphous silicon deposited on p-type high resistivity silicon wafers have been developed in Japan. Detectors of this type may be made sensitive to X-rays, gamma rays, neutrons, and beta rays. For the fast neutron sensor, a polyethylene radiator is inserted, so that the silicon sensor acts as a recoil proton detector. The thermal neutron sensor consists of amorphous silicon on which a boron (B) film is formed in order to detect thermal neutrons by utilizing the B(n,a)Li reaction. Doses as low as 0.01-0.1 mSv, and dose rates as low as 0.1 mSv/hr may be detected. Such devices, when employed as personal dosimeters, are typically 90×50×10 mm in size, but if the components were incorporated into a fixed unit, the size could be reduced.

Acceleration sensing is important for monitoring of earthquakes, tornadoes, explosions, and other shock-producing events. Small acceleration sensors are readily available commercially, as a result of their wide usage in the automotive industry. One example is produced by Entran, in which the sensor is approximately 3.5 mm square, with an external readout module approximately 32 mm long and 4 mm in diameter. Sensitivities range from 15 to 0.05 mV/g over ranges of 5 to 5000 g. The standard excitation voltage is 15 V.

Another example is Texas Instrument's Capacitive Acceleration Sensor (CAS), which has a sensitivity of up to 2 V/g over ranges of 1-10 g. Typical supply voltages and currents are approximately 5 V and 10 mA.

Temperature measurement may be accomplished using two different types of technologies, both readily available commercially. For temperatures below 0° C. (32° F.) or up to 850° C. (1562° F.), resistance temperature detectors (RTDs) are ideal. These sensors consist of a small resistor, usually made of platinum, the resistance of which is a linear function of temperature. At 0° C., the resistance of a typical such element is 100Ω. Such sensors typically have dimensions of a few millimeters. The sensitivity is 0.385Ω/° C., and accuracies of ±4.6° C. at 850° C. are routinely available (accuracy is higher nearer to 0° C.). The measurement is accomplished with a simple 3- or 4-lead voltage measurement under constant current. A current of 100 µA will produce a sensitivity of 3.85 µV/° C.

For higher temperatures (up to 3000° C. or 5400° F.), infrared temperature detectors (pyrometers) are used. Such a sensor converts the amount of infrared radiation emitted by a hot object to an electrical signal. Because the amount of radiation emitted is determined not only by the temperature of the object (via the blackbody radiation spectrum) but also by the emissivity of the material, more accurate readings are obtained by using a test object of known emissivity in thermal contact with the object of interest. By filtering the radiation to admit only that in the wavelength range of 2.1-2.3 µm, enhanced accuracy (to within 1° C./2° F.) in the range above 800° C. (1472° F.) may be achieved, with response times on the order of one second or shorter. The coupling of the light to the sensing element may be accomplished either with conventional optics (lenses and mirrors) or with fiber optics. Such sensors are available commercially and may be operated at voltages of 10 V or less.

The same detector used in pyrometer may be used to detect infrared radiation from other sources. For this application it is necessary to filter the incoming radiation to eliminate false signals from common household infrared emitters such as remote control devices. This may be achieved using a simple notch filter or bandpass filter, as mentioned above. The device may also be used for range finding and motion detection, by adding a directed source of infrared radiation (such as a diode laser) and filtering the incoming radiation to exclude all wavelengths except the wavelength of the emitter. Motion may be detected as an interruption in the steady signal returned from a distant target.

Rapid changes in barometric pressure may signal a nearby explosion. These changes may be measured with commercially available transducers, which convert changes in pressure to electrical signals using micro-machined silicon sensors. Such units are capable of measuring differential pressures of 30 psi (an overpressure of twice atmospheric pressure) with an output voltage of 90 mV. Units with larger or smaller full-scale differential pressure values are also available. The sensor excitation voltage is typically 12 V. The response time is limited by the RC rise time of the load circuit, and may thus be in the range of microseconds. The dimensions of a typical unit are 27×28×26 mm.

For the short wave length portion of the nonvisible spectrum (<290 nm) the emitters may be fabricated from AlN (e.g., epitaxial layers of AlN grown on AlN, SiC and $Al_2O_3$). These devices may be light emitting diodes or laser diodes. The detectors for light below 290 nm may be fabricated from SiC (preferably 6H SiC), AlN, GaN or InGaN.

It should be understood that an EFAN device 110 setup registration process may be initiated to make the device known to the network and to all other devices in the proximity of that device. The setup process includes, but is not limited to verifying typical identifying information (e.g., physical address, phone number, device identification number, resident profile, etc.). In the case of vehicle installation, similar information is required, however, physical address would be replaced by a GPS locator/identifier number and cellular phone number would replace the POTS number for a residence.

Although not shown in the Figures, the EFAN system 100 additionally employs a GPS based, secure communication system, whereby every EFAN set-top box and mobile EFAN device for vehicles will transmit, as part of the header information within messages delivered over the EFAN network, a discrete location and physical identification of the set-top box or vehicle sending that transmission. The remote locations receiving the messages will cross-reference the ID, physical location and time based elements imbedded in the message, to validate the transmission and prevent unauthorized access on the network. The same technique may be integrated into any network beyond EFAN where security is an issue (e.g., corporate, government, financial, and personal information), and would provide a high level of protection to the GOVNET initiative.

FIG. 7 illustrates the method 400 for providing emergency notification through EFAN Devices 110. As shown in FIG. 7, step 402 depicts the issuance of an emergency alert. After a national level decision is made to send an emergency message to some portion or all of the United States, the national level host facility 150 (FIG. 2) applies appropriate headers to messages as depicted at step 405. Then, as depicted at steps 408, 410, 412, these messages are broadcast over the notification media including respectively, 109, NWR radio, cable, as well as conventional radio or TV channels. Header or commands embedded in the message may request that some or all EFAN Devices 110, portable (Mobile) EFRAN device 110a or cable EFAN device 110b confirm receipt of the message. Thus, as depicted at step 415 each of EFAN devices 408, 410, 412 optionally transmit confirmation messages to the host facility at the appropriate level—in this example, nationally. Preferably, all EFAN Devices have a unique identification number so that the last several digits can be used as a filter so that only some portion of devices utilize their back channel communication capability. As indicated at step 420, confirmation receipt messages are received at the Host Facility, and tabulated. Further, at step 425, decisions can be made to retransmit a message or transmit an alternative message based on a tabulation at the host facility which provides an estimation of persons involved in and notified of the emergency alert.

Note that in cases of local emergencies, such as a fire, only local broadcasting of emergency messages may occur. It is even possible to send messages just to specific EFAN Devices 110 by using headers that identify the identification numbers of specific devices 110. Note that messages may be encoded for security, such as all National Guard report to location xx, or to prevent false messages from being received.

Figure 8:
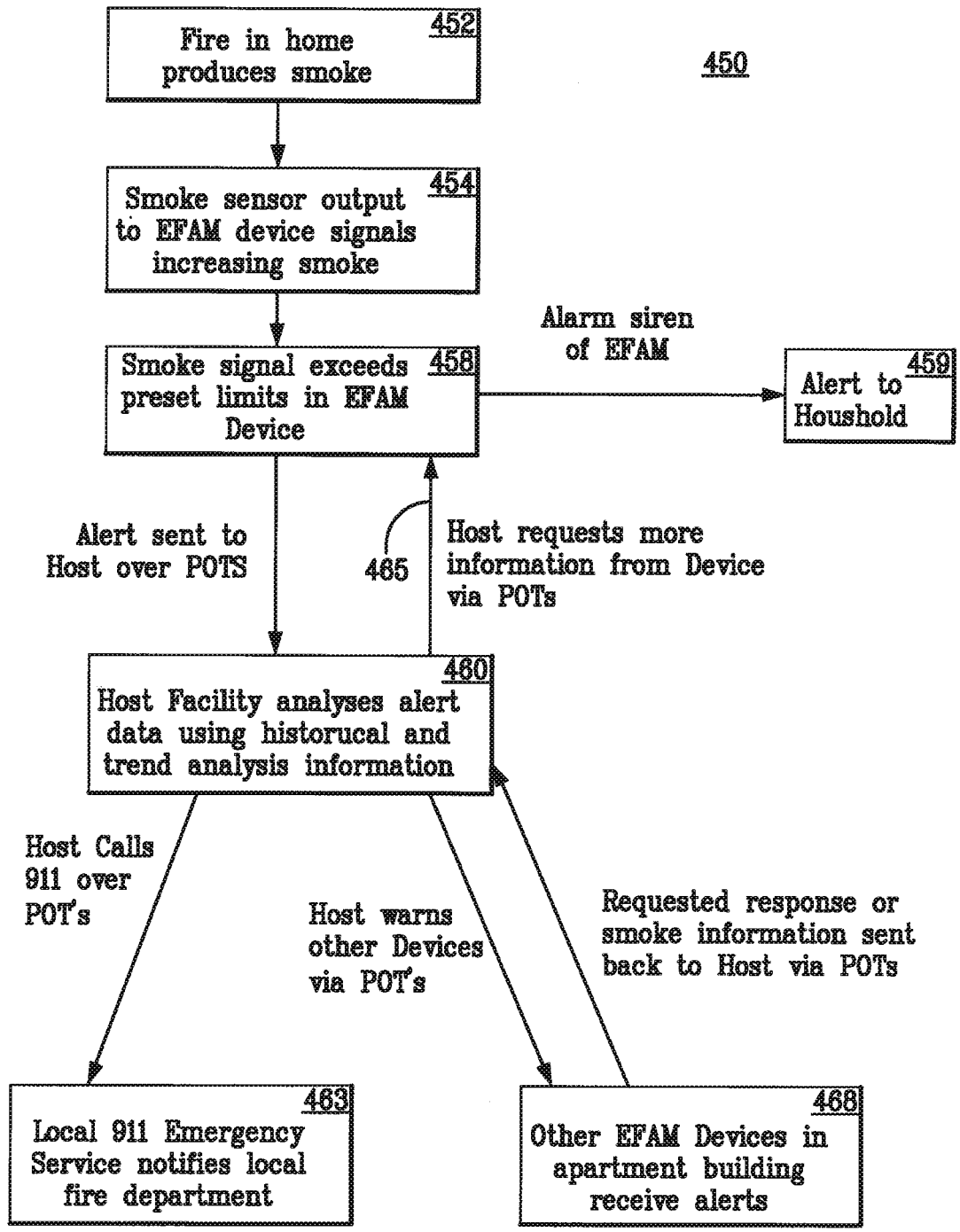

FIG. 8 illustrates the process 450 of emergency notification occurring for a local emergency based upon the EFAM Device 10 detecting a dangerous condition by a measurement sensor. For example, assuming the presence of smoke due to a house fire at a local residence as indicated at step 452, the EFAN device smoke sensor 454 will sense the increase of smoke and generate a smoke level measurement signal. Then, at step 458, the EFAM Device records this level and compares the level to a preset threshold. When the smoke level exceeds a first preset limit, or, if the EFAN device determines an alarm or alert condition exists based upon historical data stored in the Device's memory, an alarm signal is generated at the Device 110 from the Device's internal speaker for alerting the household at step 459. The purpose of the alarm is to alert unaware occupants of the problem allowing them to exit to safety, deal with the problem or, perhaps, rectify an error in the Device's sensing and decision making process. Further, if smoke levels rise above a second threshold or trend prediction, the EFAM Device may send an alert to the Host Facility at the local level via the POTS back channel. At the host facility, as indicated at step 460, the alert data is analyzed. Automatic decision-making algorithms at the host facility may then choose to notify the appropriate emergency management service, e.g., 911 emergency service, as indicated at step 463, or, request more information from the EFAN device 110 as indicated at 465. In one embodiment, the Host Facility may use profile information or confirmation from other EFAM devices to supplement information known about a potential alert condition. Thus, as indicated at step 468, via a POTS backchannel, the host facility may generate an alert or request information from other EFAM Devices in the same location or building as the device 110 originating the emergency alert. By having the Host Facility notify a 911 operator rather than directly sending an alert to a local fire department, human judgment may intervene in the sequence of events. It should be noted that wireless communication links may be used within a home allowing alarms to be sent to speakers located at other parts of the house or, for sensors to be placed in other parts of the house.

Figure 9A:
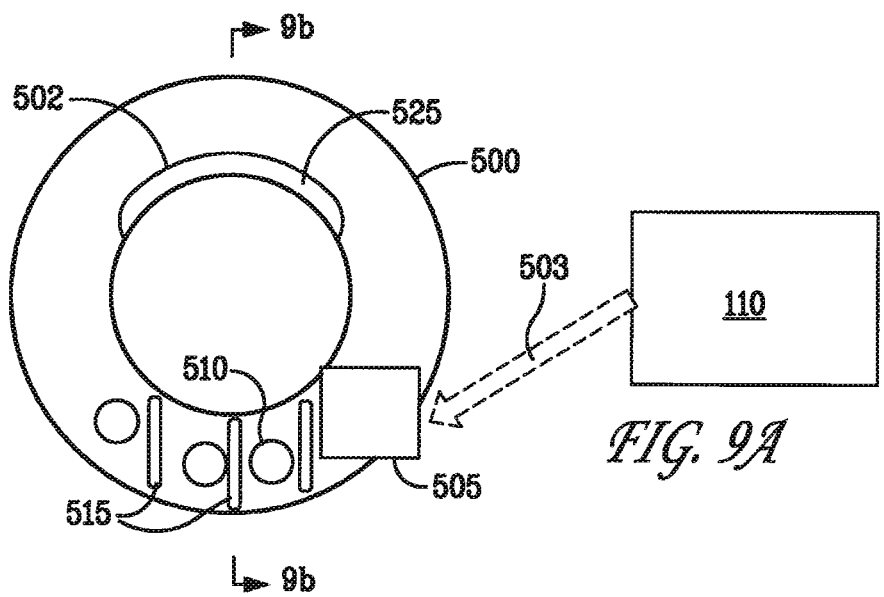
Figure 9B:
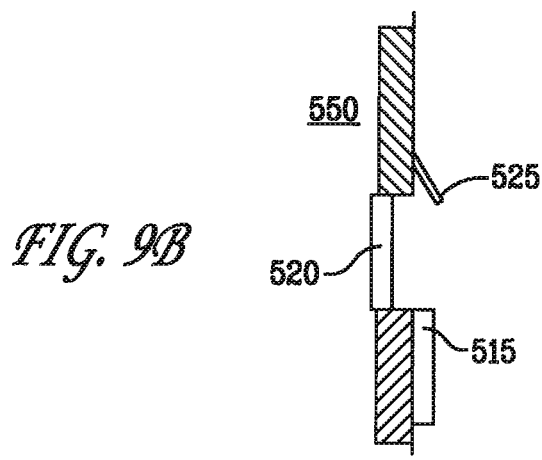
Figure 9C:
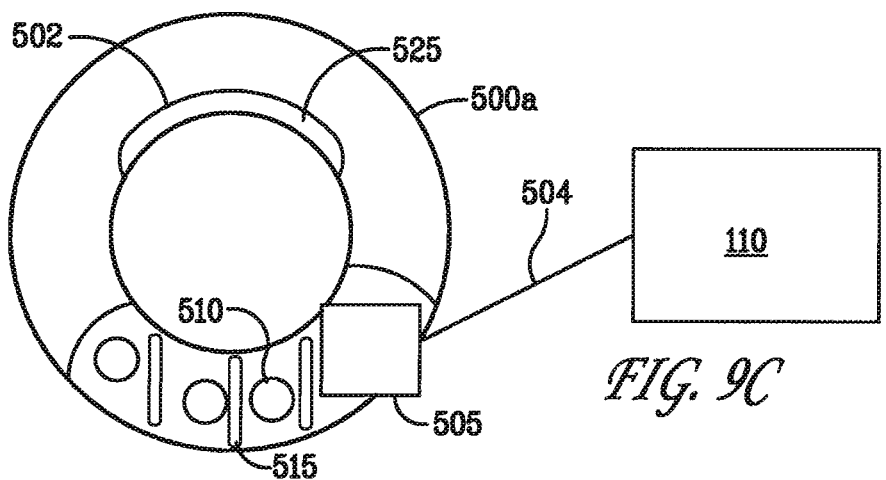

The ability of the EFAN device to automatically initiate turning on of the television or display device to present the emergency notification content when the device is determined to be off is now described with respect to FIGS. 9(a)-9(c). Specifically, FIGS. 9(a) and 9(c) illustrate respective embodiments for the mechanism 500 enabling automatic television power-up, i.e., turning on, or television volume and/or channel change. Assuming the knowledge database of the host facility maintains the telephone number of the home residence and the cable service provider and/or DBS provider and, the type of television set equipped at the home residence, the specific protocol turn-on code for turning on the set and adjusting volume and channels will be known. The code may be stored at the EFAN set-top box ROM or downloaded via POTS or streamed via DBS or cable. In the preferred embodiment, as depicted in FIGS. 9(a) and 9(b), the mechanism 500 includes a circular plastic tag element having an adhesive backing that may be easily mounted on the television in a manner to surround the remote photodetector 520 of the television 550 as shown in the side view of FIG. 9(b). In an emergency, prior to or during receipt of the alert message and display turn-on code, the EFAN device 110 will wirelessly transmit, via an RF transmitter device or an 802.11a or 802.11b wireless transmission standard, the code for enabling automatic turn-on, volume or channel change to mechanism 500. The receiver electronics of the mechanism 500 includes circuitry 505 capable of converting the RF transmission 503 with the appropriate turn-on codes into IR (infrared) signals capable of being transmitted to the television's photodetector circuit 520. Particularly, a series of IR emitters 515 are provided to transmit the codes across the tag which are reflected by a lip 525 extending partially over the the TV's photodetector mechanism 520. The lip 525 may be comprised of a metal material suitable for reflecting signals onto the photodetector 520. In this manner, the turn-on, volume and/or channel change codes will be received by the TV set so that the emergency message may be automatically presented. In the alternate embodiment, a circular plastic element 500a is provided for receiving the turn-on, channel and volume change codes via the EFAN device 110 over a wired connection 504. The codes are received at the receiver electronics 505, which format signals suitable for transmission by the IR emitters 515 to the TV photodetector 520 via the reflective lip 525.

In the preferred embodiment, the EFAN device 110, alone or in conjunction with a host facility that is linked to the device, fuses information from different sensors to (1) perform trend analysis; (2) establish relationships between measurements of related parameters; and, (3) compare measurements and relationships to established threshold limits. For example, in the context of a residential fire where the device at the residence has sensors for smoke, carbon monoxide and temperature, a trend analysis for each parameter may be performed. Additionally, relationships between sensed levels of smoke and carbon monoxide may be developed according to stored algorithms. Lastly, the measurements of the three parameters and the relationships are compared to established threshold limits.

Where a dangerous situation is indicated, an appropriate communication is directed to local emergency services and, optionally, neighbors may be informed of the situation.

The device also preferably has the capability to acknowledge receipt of the emergency notification content from the host facility. This acknowledgment may go directly back to the host facility where it may be displayed and processed for trends and relationships, and comparison to established limits (for trends, relationships and measurements). The host facility may then send notifications or requests for action to the device, all devices in a particular geographic area, and/or to emergency services. For instance, in the case where the emergency notification is to evacuate a particular area, the notification may originate from a federal agency, but the acknowledgment may be sent to the local law enforcement agency that is responsible for supervising the evacuation. The device may also be capable of interaction between the user and the host facility. For instance, after an acknowledgment is received by the host facility, questions may be transmitted to the user and the user may then send back an answer. For instance, if a bomb blast is detected in an area and a notice is sent to the nearby users, after a user acknowledges the receipt of the notice, the host facility may ask the user if he or she has heard the blast or seen the effects of the blast. The user may send back an affirmative or negative answer regarding the question(s) concerning the bomb blast.

In addition to sending a notification, the sensor data may also be used to develop a record. For instance, a water detector can detect a leak/flood in a home, which would result in a notification to the home or an emergency contact person designated for that residence, regarding the potential leak/flood, and the need to turn off the water supply. In addition to the water detector, a temperature measurement device may have been monitoring a trend indicating that the premises would soon drop below freezing and that there was still water pressure in the lines. In this case the alerts would be issued preemptively as a result of the temperature drop and the appropriate services or emergency contact person designated for that residence, would enter the premises prior to the water pipes rupturing due to the freezing condition. As water damages make up the largest percentage of household claims paid out by insurance companies, the EFAN system would reduce the monetary damages caused by broken pipes and may be capable of shutting off the water to the house.

In addition to placing the devices in homes and buildings, additional supplemental external devices may be placed outdoors, such as in the street boxes for cable, telephone, and power that control certain utility services for local (e.g., neighborhood) transmission. The data from these supplemental external devices may be transmitted to a remote location and used in combination with trend analysis to formulate an appropriate emergency notification to be used in conjunction with those devices located in homes and offices.

In one example, the device can detect the temperature in the apartment of an elderly couple or handicapped person and transmit data back to a host facility, such as a public health organization or the police department that the temperature is too low and poses a health risk to the occupants. A local alarm preferably is generated also to warn the occupants of the dangerous situation. The remote location may directly or indirectly aid the couple in getting the temperature back to normal. For instance, the couple may have inadvertently forgotten to order heating oil or the drop in temperature can be due to a mechanical failure of the heating system. The remote party can intervene in getting the service restored by sending a notification to the heating utility. The notification may also be sent to neighbors or local authorities to aid the occupants by checking on their health or to remove them to a safer location. A feedback may also be provided where the remote party can remotely adjust the occupants' thermostat. This example is also equally applicable to a detection of a dangerous level of carbon monoxide, methane, propane or natural gas.

In another example, the device can detect an excessive temperature in a number of apartments in a residential apartment building signifying a fire or explosion in the building. The detection of the fire can be by detecting a temperature above a certain threshold or by detecting a trend, which indicates a fire is probable. An emergency notification may then be sent to the residents of the building informing them of the nearest routes for leaving the building, as well as to emergency and medical personnel in the vicinity informing them of the need to respond to the building and the conditions they may likely encounter at the building. An isotherm of the building may also be generated from the data to inform firefighters and other personal of the source of the fire or explosion and also of the temperatures. The isotherm may be displayed or printed at the firehouse, on the fire truck, on a handheld screen by the firemen, or even integrated into the firemen's visor. Such a display can be updated in real-time or near real-time. Other parameters detected can also be plotted in a similar way and delivered to the appropriate third party, such as an isoradiation plot of a particular geographic vicinity in the case where a cluster of sensors in a certain vicinity detect higher than normal levels of radiation.

In yet another example, accelerometers in the device can detect a shock indicative of a blast, earthquake, or the touchdown of a tornado. Other sensors can be used to corroborate the finding of the accelerometer, such as a temperature or pressure sensor, which when correlated with the accelerometer, may be used to decide if a detected shock is the result of an earthquake or an explosion. The host facility can then inform the appropriate users with an appropriate emergency message. Furthermore, different groups or individuals can be provided with different customized messages. For instance, if it is detected that a tornado has touched down in a certain vicinity, some people may be notified to leave the area to the west, others may be notified to leave the vicinity to the east, while still others may be notified to go to local shelters or into their basements.

Medical and emergency personnel based in different locations may also be given different messages.

In yet another example, the detection of carbon monoxide, propane, or natural gas in a structure would result in a notification to the occupants of that particular residence to leave the residence and may also result in a notification to the utility serving the residence as well as emergency personnel in the area. As discussed above, a feedback loop may also be employed to remotely shut off the source of the detected gas. The notification can be based solely on the detection of a particular gas or may be based on a trend analysis alone or in combination with data from other sensors such as temperature and smoke detectors.

In another example, devices of the invention may include sound measurement sensors that look for particular sound profiles that match certain emergency events. For example, a sound measurement sensor may look for a profile or profiles that correspond to the signature sound of gunshot(s). A gunshot profile may be characterized by a sound in a known frequency range and above a predetermined decibel level. Detection of a sound fitting a gunshot profile would initiate the host computer querying persons at the device location and/or notifying local emergency services.

Similarly, the detection of a biohazard in a commercial building can result in the notification of the tenants of the building to evacuate and may even discriminate between different areas of the building to evacuate the building using different routes. The notification may even inform the tenants of the proper steps to take to minimize the effects of the biohazard, for instance to cover their mouths and nose with a wet fabric, or to simply remain inside, closing all windows, doors and heating, ventilation and air conditioning units until professional help can arrive to evacuate them safely. The detection would also result in the notification of government agencies, local law enforcement and local medical personnel. A notification may also be sent to a local hospital that people exposed to a certain biohazard will be arriving. The sensors from a plurality of devices in a common geographical area can be used to detect the expansion of a biohazard plume and to notify those areas in the direction of the plume accordingly. For instance, vehicles entering an area where the plume is expected to travel can be warned to turn away and residents in the area can be told to evacuate or take precautionary measures.

In still yet another example, data from weather sensors connected to the device can be transmitted by the device and provided to news and/or education networks. The data from the sensors can also be used to formulate weather reports or predict weather occurrences such as dangerous thunderstorms approaching a certain area. Residents in that area can then be notified of the approaching storms and instructed to take the proper precautions.

Collected data may be utilized to calibrate sensor parameters. For example, compensation techniques (analog, digital, or software) may be utilized to calibrate or reduce the effects of sensor or related component aging, temperature drift, and stress, along with performance degradation.

While the amount of localized data processing and storage, alarm thresholds, and other sensor parameters may be pre-set when the device is shipped or installed, in certain embodiments these settings may be dynamically changed based upon an evolving threat environment. For example, while accelerometer data may be utilized to monitor for earthquakes, the sensor settings may be remotely changed to monitor for larger "g" events such as bomb blasts and building collapses. In this case the gain of amplification system may be decreased against a fixed threshold, or the threshold may be adjusted to "listen" for a candidate event. The integration time and data processing time pre-threshold may be significantly reduced or eliminated if the event occurrence may endanger or impair the ability of the sensing device to communicate its findings.

While the present invention is applicable to any existing or future data communications means, the communications architecture may be implemented in a fashion that permits communications and data sharing among local sensing devices in a hierarchical fashion. For example, the fire detection trigger in one unit of a multi-unit dwelling will initiate an alert to a host facility, which will enable (turn-on) all sensors within that building or neighborhood. Additionally, since various sensor readings may be periodic (fixed or random duty cycle) and utilize one or more data checks or internal sensor cross-checks to reduce or eliminate false alarms, a message from a local sensor may initiate the alert to a host facility to command all other sensing location within the building to maximum sensitivity, highest frequency or duty cycle of sensing, along with a reduction or elimination of false alarm safeguards to eliminate any undue delays in notification. The message from the local sensor preferably would be transmitted to the host facility, which would then transmit the command to all or a predetermined number of proximate devices.

A hierarchical transmission of data is employed where local measurement trend analysis, when compared to established threshold limits, initiates resident notification and transmission to a host facility. At the host facility, the collected data is displayed and processed, using trend analysis, to establish correlation and trends in comparison to threshold limits. Based upon a protocol established for that particular area, a transmission is initiated to proximate locations via query from the host facility. The measurements for proximate locations then are processed by the remote location, using trend analysis and comparison to established EFAN system protocols. If, in comparison to established EFAN system protocols or by the exercise of judgment of one or more persons, an emergency condition exists, then (i) all areas in proximity to the first device initiating the transmission are notified with a pre-determined message or other message including alarms, and (ii) the remote location initiates notification of emergency services and government agencies as defined by the system protocols or by the exercise of judgment by one or more persons at the remote location. For example, units within a building in which a fire has been detected may all be commanded to a heightened state of alert and notify residents immediately, regionalized nodes in adjacent buildings may also receive the same level of notification and commanded alert, somewhat more remote buildings might receive a lower level of alert and subdued notification, while data collection and processing sensors of emergency response authorities receive their appropriate notifications.

In yet another embodiment of the present invention fusion of multi-sensor data can occur at different points. Locally, at a given node (for example a single set-top box) data can be processed to establish a correlation between readings from accelerometers, pressure transducers, decimeters, and temperature measurement devices to detect bomb blasts. The ability to distinguish various threats, attacks, and emergencies is of profound benefit. For example, in one embodiment of the present invention one or more, (preferably multiple), sensor profiles are stored in the set-top box. These stored profiles may be updated periodically to reflect the evolving nature of perceived threats. The data collected from one or more sensors is processed against the threat profiles to discern if an emergency exists and, to the extent possible, discern the nature of the emergency so that prompt action may be taken. Localized threat processing may be straightforward, such as establishing a simple threshold, and as sophisticated as correlating multi-sensor data over a rolling time period utilizing threat/data covariance techniques to discern an actual threat from among a multitude of candidate events, both benign and dangerous. It is anticipated that a mixture of both raw and processed sensor data may be transmitted for analysis and remote data review. Limiting the amount of unprocessed data has significant benefits in remote data aggregation, review and processing, while raw data enables the use of more sophisticated and robust processing techniques for better analysis. Each host facility can communicate with regional or national hosts. Under certain conditions a device will communicate its message to both its local host facility and the regional and/or national host.

For example a routine small kitchen fire may only be applicable to local emergency authorities (e.g., local fire house, police, EMS). However the data may also be logged at the local center for use at the governmental level, such as compiling statistics on home hazards, or for even insurance company notification. This might be on a broadcast basis (to all governmental safety agencies), on a subscription basis, or compiled and periodically polled. However, if an alternate threat is detected, such as terrorist biohazard, the alert notification can be triggered at the regional, state, national, or international level as so desired. It is anticipated that the occurrence of any event of this nature will be reported instantaneously, although there may be levels of safeguards built in for validation at one or more levels to prevent false alarms. Further, certain types of data may be restricted based upon a need to know basis. Thus, each type of threat or alarm event may have one or more routing tables for notification.

In another embodiment of the present invention, platforms operated by the government (e.g., the United States government), which include vehicles (manned and unmanned), aircraft (manned and unmanned), ships (surface and submarine, manned and unmanned), satellites and the nation's aircraft control system, collect and transmit measurements and data to a designated national government location. At this location, the measurements and data are displayed, so that they are subject to both automated analysis and analysis by the authorized person(s) at the remote location. The EFAN system then processes the measurements and data to establish relationships and trends, and to (A) utilize the analysis of relationships and trends to compare the measurements and data against limits established by the EFAN system protocols for the area that includes the affected location and (B) permit the exercise of judgment by authorized person(s) at the remote location. Based upon this analysis, the EFAN system provides information or instructions for action. The nature of such information or instructions and the selection of the recipients of such information or instructions is determined either (A) automatically as established by the EFAN system protocols, or (B) by exercise of judgment by the authorized person(s) at the host facility.

In another example, if air traffic control were to detect a plane deviating from its flight plan, the system would cross check the passenger list from a comprehensive passenger registration/clearance system (for example, the system described in commonly owned U.S. patent application Ser. No. 09/976,836 filed Oct. 12, 2001 entitled SYSTEM AND METHOD PERMITTING CUSTOMERS TO ORDER SELECTED PRODUCTS FROM A VAST ARRAY OF PRODUCTS OFFERED BY MULTIPLE PARTICIPATING MERCHANTS AND RELATED SECURITY APPLICATIONS, the whole contents and disclosure of which is incorporated herein by reference), identify if there were any correlations between passengers (e.g., relationships, age, past travel destinations, security issues, international security databases, etc.) immediately transmit that information to a remote location (e.g., Federal Bureau of Investigation, Federal Aviation and Air Control, US Military and other emergency services) and simultaneously place on alert a plurality of devices to monitor the situation. The types of devices available would be unique to the area of incidence, however typically they would include, but not be limited to, fixed position monitoring stations (equipped with fixed based video and fixed based infrared allowing 360° visibility/coverage), military ships stationed in proximity to the incident and military jets on standby for alert notification). The responsible authorities would continue to try to communicate with the aircraft in question, however if all query results were negative, the authorities would alert aircraft for visual confirmation/verification. Continuous monitoring by the fixed station locations would supplement the aircraft until they mitigate or eliminate the threat.

Another example of how the EFAN system would operate during a major national emergency may be demonstrated in the event of a terrorist detonating an explosive device in a populated city, and that device were to be attached to a small amount of radioactive material (e.g., enriched plutonium or spent nuclear fuel), there would be an instant alert generated by all set-top box monitors, fixed location monitors and monitor equipped vehicles in the area. The initial readings would measure radiation (e.g., alpha, beta, gamma) and EMP (electromagnetic pulse) and initiate a transmission to a host facility for notification to emergency services (e.g., police, fire, local, regional and national government locations). Following the established protocols for the specific region, the host facility (ies) would immediately validate the readings, and then transmit alert notification to all potentially affected areas, inclusive of residential alarms along with instructions as to what precautions or evacuation procedures to take. The host facility (ies) would also initiate a "record and transmit" request to all monitors in the region. Within seconds, both on display and print, iso-radiation charts would be generated to identify the source and detect the plume radius and direction of the radioactive cloud. This information is automatically transmitted to all emergency services (e.g., Federal Bureau of Investigation, local and regional hospitals) and evacuation notifications are sent to all residents and vehicles in proximity to, or in the intended path of, the cloud. Additional actions would be taken to secure the public from all access to the impending threat, to launch military operations necessary to monitor and control the operations and contain the incident. Anyone having been exposed to the radioactive material would be instructed where to turn for medical treatment.

A secondary feature of the system would be its ability to identify those individuals who have not realized that they were exposed to and contaminated by radioactive materials. In this case, significant increases in high-energy radiation would be measured as contaminated individuals came in proximity to their monitored vehicle or television set-top box. These individuals may show up outside of the plume radius and would require treatment by emergency services and/or receive alert notification to seek treatment at the instructed facility.

In a manner analogous to data collection, emergency notification may also be implemented at a local, regional, state, national, or international level by automatic or human decisions, or a combination thereof. For certain types of alarms such as fire, local communications and decision makers will permit rapid evacuation from the threat—along with automatic notification to the appropriate emergency response agencies. At higher levels within the hierarchy it may be advantageous to have human decision makers review automated screening responses before notification and action, before false alarms are transmitted. However, due to the inherent delay by putting the "man in the loop" it is more desirable for these stations to be automated using one or more discrimination algorithms.

As previously stated, the devices can transmit the data to the host facilities via any data link known in the art such as cable, telephone, satellite, cellular or RF transmission. Additional communication protocols may be utilized, although those that are compatible with the existing data communications infrastructure are preferred.

As described herein, the plurality of digital and analog environmental/physical measurements/data points performed at the EFAN devices 110 located in homes, offices and vehicles, may be used by national agencies and private companies to become a comprehensive, highly reliable solution in security. The Emergency Feedback and Notification (EFAN) system's ability to collect a plurality of digital and analog measurements/data points from a broad array of sensor devices located in homes, offices and vehicles, enables it to become a comprehensive, highly reliable solution in security. With the system's monitoring capability, a resident or office worker may activate the sound/motion detection sensors for monitoring a vacated space. In the event of a break-in at a secured residential home, vehicle or office location, alerts may be generated by the extreme noise or motion detectors, in conjunction with other devices such as light emitting devices located in close proximity to light detecting devices (e.g., (1) conventional infrared photodetectors or (2) emitters and photodetectors in the non-visible spectrum operating at short wavelength (<290 nm)). Emitters may be powered by batteries and the detector is capable of transmitting a signal, either by wire or wireless, to the EFAN set-top box. In addition, the set-top box, after processing the relationships, trends and limits of prior inputs, may increase security, e.g., by changing the previously defined frequencies which power the emitter; or, by changing the pulse width based upon relationships or limits; or, by using a random number generator to alter the pulse width. Additionally, magnetic sensors and magnets, for example, Hall effect devices, may be used to initiate a signal to the set-top box that, in turn, would transmit the alert message to a location that would enable authorities to be directed to the initiating alerts and simultaneously send notification to all residents of that neighborhood to be on the alert, in accordance with the techniques of the system and method for delivering, disseminating and viewing/listening to emergency information as described herein.

The EFAN system 100 and the interactive TV set-top box may additionally be used in connection with the health care industry. For example, the plurality of digital and analog measurements/data points collected by the EFAN system 100 from the broad array of sensor devices may be used by national agencies and private companies to perform/enhance trend analysis; establish a relationship between variables and the importance of variables (e.g., weather modeling and forecasting; agricultural research, development and crop/animal optimization; pharmaceutical research; and, the development of other studies requiring defined variations and controls); increase the capability to perform statistically valid, high statistical significance (high confidence interval) analysis and experiments; and, allow relationships and interactions to be understood (e.g., providing a greater ability to establish whether a particular drug is effective (i.e., has a high efficacy). For example, the EFAN system 100 may be used to prove that a particular drug is or is not effective when statistical blocking is used to take into account variations in ambient temperature and humidity or to understand and establish optimum treatment to allow for geographical variation in the efficacy for a specific drug. The combination and relationship between environmental measurements and treatment history with geography, in addition to exposure to certain workplace environments and residential history/environment, family/history and efficacy for specific drugs, will provide for a substantial improvement in tailoring a patient(s)' treatment.

In connection with an interactive TV set-top box implementation of the invention, and for use in health care, the set-top box may include an interface providing analog and/or digital input to allow recording, trend analysis and transmission of certain physical measurements to doctors or technicians (as devices become available) (e.g., blood sugar measurements for diabetics similar to existing blood sugar measurement devices and measurement of other blood chemistry or other physical parameters). The device may additionally be utilized to input prescription numbers and requests by patients and allow remote input by doctors and pharmacists to enable dissemination of information, including current pricing at local pharmacies, side effects, adverse drug interactions and additional information from pharmaceutical companies. The device may additionally be used to send an alert notification to notify a user of the time to take prescriptions or renew a prescription. Another use for the device is to send a notification transmission to a patient's doctor indicating the detected physical parameters (e.g., vital signs such as blood pressure, pulse, temperature, electrocardiogram) or to store the detected physical parameters for display to the patient. Another use for the invention, when coupled with the capabilities afforded by an interactive TV implementation, would be to conduct interactive sessions with providers (e.g., doctors, specialists, skilled professionals) covering a plurality of ailments and services (e.g., psychotherapy sessions, support groups, weight loss/nutritional counselling, outpatient follow-ups and physical therapy techniques).

The measurements and data may further be used, in certain instances, as an educational tool or by news agencies.

In sum, the set-top box EFAN device 110, whether taken alone or in conjunction with a host facility that is linked to the device, fuses information from different sensors to: (1) perform trend analysis; (2) establish relationships between measurements of related parameters; and, (3) compare measurements and relationships to established threshold limits. For example, in the context of a residential fire where the device at the residence has sensors for smoke, carbon monoxide and temperature, a trend analysis for each parameter may be performed. Additionally, relationships between sensed levels of smoke and carbon monoxide may be developed according to stored algorithms. Lastly, the measurements of the three parameters and the relationships are compared to established threshold limits. Where a dangerous situation is indicated, an appropriate communication is directed to local emergency services and, optionally, neighbors may be informed of the situation.

Those skilled in the art will appreciate that the emergency feedback and notification system (EFAN) 100 of the present invention has many advantages including:

1. Immediate data feedback from discrete addresses to emergency personnel with rapid notification to affected households, vehicles and other locations;

2. Very simple and robust system. Current EAS system only addresses households with television or radios turned on. The average household in the US has their radio or television on less than 30% of the time during a 24 hour day. Since many fire and police emergencies occur at night, at a time when many people are asleep, the current EAS system provides little value in those events. In most emergencies, the government has no confidence that everyone is notified by an EAS broadcast. Many people rarely watch TV and may reside in outlying remote areas where interaction with people is limited. For example, even in hurricane evacuations, where the potentially affected population has days to become aware of the storm, the police and other emergency personnel must go to every door and dwelling to insure complete evacuation. This process is in contrast to the EFAN system where evacuation efforts can be targeted focusing first on elderly and handicapped;

3. The EFAN System provides complete coverage for feedback and notification covering more than 100+ million households, 130+ million vehicles, and 30+ million offices; with approximately 300 million data collection points and the ability to notify affected areas both broadly and individually, EFAN gives the general population confidence in the government's ability to provide correct notification, direction and response in emergency situations;

4. The EFAN system can be rapidly and cost-effectively installed using existing infrastructure (DBS, cable, telephones, TV's, NOAA radio, general radio and cellular telephone). Since the components required to complete the EFAN system are primarily devices produced by consumer electronic manufacturers and suppliers, having the proven capability to deliver low-cost, high volume, high reliability and fast time to market products, this in combination with existing infrastructure allows rapid completion of the EFAN system. The current EAS processes of design, production, installation and testing of a new system with far more limited capabilities has required up to six years to complete;

5. Feedback of meaningful data from a significant number of data points produces a high level of confidence from statistical and trend analysis;

6. The EFAN system is electronic. It does not depend upon humans to collect data. For instance, 911 switchboard personnel will not have to rely on potentially frightened or hysterical people to determine whether there is an actual emergency. The feedback features combined with trend analysis from redundant sensors provide a very fast response to a wide variety of emergencies, in many of which cases the saving of lives depends on early and immediate notification and response with a high degree of confidence (e.g. fires);

7. The EFAN system provides assistance with elderly and handicapped people, where notification of authorities may not otherwise occur (e.g. where the resident has hypothermia because the temperature in a house has dropped from 70° F. to 38° F. over several hours); with its redundant sensing, trend analysis, and feedback with automatic transmission to the appropriate emergency services, the EFAN system will save a significant number of people who would otherwise freeze to death every year in their own homes due to electrical/mechanical failure of the heating system, a loss of power and or depletion of heating fuel; and, 8. Beyond EFAN's primary intent of emergency feedback and notification, EFAN provides a host of other ancillary benefits. For example, EFAN offers significant energy conservation measures in the home and office, utilizing a "learned response" optimization technique that easily integrates with heating, ventilation and air conditioning systems. EFAN additionally functions as a deterrent to grand-theft auto utilizing its GPS and communication capabilities. EFAN will deter the theft and transportation of stolen goods utilizing passive radio-frequency (RF) tags that will identify, locate and communicate their physical position back through the network. EFAN could even act as a child locator in abduction situations, where the child wears a voluntary RF tag on a bracelet, necklace, watch or piece of clothing. As a result of this increased security, EFAN will enable delivery of a lower cost of insurance for home, auto and personal coverage. Finally, because instances of terror have a tendency to "cocoon" citizens inside their home, EFAN will continue to stimulate consumer spending while in the home through a convenient, secure, credit card enabled, interactive television commerce system, which would not require the Internet.

Those skilled in the art will appreciate that the emergency feedback and notification system (EFAN) 100 of the present invention, may be advantageously implemented for displaying emergency content via an electronic billboard display system such as described in commonly-owned, co-pending U.S. patent application Ser. No. 09/416,333 filed Oct. 12, 1999 entitled SYSTEM PERMITTING RETAIL STORES TO PLACE ADVERTISEMENTS ON ROADSIDE ELECTRONIC BILLBOARD DISPLAYS THAT TIE INTO POINT OF PURCHASE DISPLAYS AT THE STORES, the whole contents and disclosure of which is incorporated by reference as if fully set forth herein. Further, the EFAN system and set-top device of the present invention, may be advantageously implemented with a music and video distribution system such as described in commonly-owned, co-pending U.S. patent application Ser. No. 09/855,992 filed May 15, 2001 entitled MUSIC DISTRIBUTION SYSTEM, the whole contents and disclosure of which is incorporated by reference as if fully set forth herein. Further, the EFAN system and set-top device of the present invention may be further utilized in conjunction with interactive television systems such as described in commonly-owned, copending U.S. patent application Ser. No. 09/866,765 filed May 30, 2001 entitled METHODS AND APPARATUS FOR INTERACTIVE TELEVISION, the whole contents and disclosure of which is incorporated by reference as if fully set forth herein.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed:

1. A method for disseminating emergency content, the method comprising:
   determining, by an emergency notification system, that a plurality of devices are in a location corresponding to an emergency notification;
   delivering the emergency notification from the emergency notification system to the plurality of devices, wherein at least one device of the plurality of devices is configured to determine whether at least one characteristic of a location of the at least one device is associated with the emergency notification; and
   receiving a response from the at least one device, the response comprising an indication whether the at least one characteristic of the location of the at least one device is associated with the emergency notification.

2. The method of claim 1, wherein the response from the at least one device comprises an indication of the location of the at least one device.

3. The method of claim 1, further comprising:
   generating, by an emergency notification system, a subsequent emergency notification based, at least in part, on the response from the at least one device.

4. The method of claim 1, further comprising:
   delivering a subsequent emergency notification based, at least in part, on the response from the at least one device.

5. The method of claim 1, wherein the at least one device comprises one or more from a group consisting of a set top box, a computer, a video cassette player, a DVD player, a CD player, a WebTV device, a video game player, a video game controller, a pager, a cellular phone, and a personal digital assistant.

6. A system for disseminating emergency content, the system comprising:
   one or more computing devices configured to determine that a plurality of devices are in a location corresponding to an emergency notification;
   a transmitter configured to deliver the emergency notification from the system to the plurality of devices, wherein at least one device of the plurality of devices is configured to determine whether at least one characteristic of a location of the at least one device is associated with the emergency notification; and
   a receiver configured to receive a response from the at least one device, the response comprising an indication whether the at least one characteristic of the location of the at least one device is associated with the emergency notification.

7. The system of claim 6 wherein the response from the at least one device comprises an indication of the location of the at least one device.

8. The system of claim 6, wherein the one or more computing devices are further configured to generate a subsequent emergency notification based, at least in part, on the response from the at least one device.

9. The system of claim 6, wherein the transmitter is further configured to deliver a subsequent emergency notification based, at least in part, on the response from the at least one device.

10. The system of claim 6, wherein the at least one device comprises one or more from a group consisting of a set top box, a computer, a video cassette player, a DVD player, a CD player, a WebTV device, a video game player, a video game controller, a pager, a cellular phone, and a personal digital assistant.

11. A method for presenting an emergency message, the method comprising:
   receiving, by a first device, a first signal related to an emergency message intended to be transmitted to devices in a location;
   generating, by the first device, a second signal in response to receiving the first signal, the second signal configured to cause a second device to output the emergency message, wherein at least one characteristic of a location of the second device is associated with the emergency message; and
   sending the second signal from the first device to the second device;

wherein the second device is configured to turn on and output the emergency message on a display component in response to receiving the second signal.

12. The method of claim 11, wherein the second signal comprises an infrared signal.

13. The method of claim 11, wherein the second signal comprises control information to set a volume level of the second device.

14. The method of claim 11, wherein the second signal comprises control information to change a channel of the second device.

15. The method of claim 11, wherein generating the second signal comprises converting the first signal into the second signal.

16. A system for presenting an emergency message, the system comprising:
a receiver configured to receive a first signal related to an emergency message intended to be transmitted to devices in a location;
at least one computing device configured to generate a second signal in response to receiving the first signal, the second signal configured to cause a device to output the emergency message, wherein at least one characteristic of a location of the device is associated with the emergency message; and
a transmitter configured to send the second signal to the device;
wherein the device is configured to turn on and output the emergency message on a display component in response to receiving the second signal.

17. The system of claim 16, wherein the second signal comprises an infrared signal.

18. The system of claim 16, wherein the second signal comprises control information to set a volume level of the device.

19. The system of claim 16, wherein the second signal comprises control information to change a channel of the device.

20. The system of claim 16, wherein the at least one computing device is configured to generate the second signal by converting the first signal into the second signal.

* * * * *